United States Patent
Lockert et al.

(10) Patent No.: US 11,673,086 B2
(45) Date of Patent: Jun. 13, 2023

(54) AIR CLEANER ASSEMBLY WITH RESTRICTION INDICATOR

(71) Applicant: Donaldson Company, Inc., Minneapolis, MN (US)

(72) Inventors: Michael J. Lockert, Cedar Falls, IA (US); Douglas J. Nagel, Stout, IA (US); Richard P. Manahan, Lake Elmo, MN (US); Mark J. Gailloux, Eden Prairie, MN (US); Steven K. Campbell, Lakeville, MN (US)

(73) Assignee: Donaldson Company, Inc., Bloomington, MN (US)

( * ) Notice: Subject to any disclaimer, the term of this patent is extended or adjusted under 35 U.S.C. 154(b) by 518 days.

(21) Appl. No.: 16/758,722

(22) PCT Filed: Oct. 24, 2018

(86) PCT No.: PCT/US2018/057336
§ 371 (c)(1),
(2) Date: Apr. 23, 2020

(87) PCT Pub. No.: WO2019/084154
PCT Pub. Date: May 2, 2019

(65) Prior Publication Data
US 2020/0360849 A1    Nov. 19, 2020

Related U.S. Application Data

(60) Provisional application No. 62/576,263, filed on Oct. 24, 2017.

(51) Int. Cl.
*B01D 46/00*    (2022.01)
*F02M 35/09*    (2006.01)

(52) U.S. Cl.
CPC ..... *B01D 46/0086* (2013.01); *B01D 46/0004* (2013.01); *F02M 35/09* (2013.01); *B01D 2265/028* (2013.01); *B01D 2279/60* (2013.01)

(58) Field of Classification Search
CPC .......... B01D 46/0086; B01D 46/0002; B01D 46/0004; B01D 2265/028; F02M 35/09
See application file for complete search history.

(56) References Cited

U.S. PATENT DOCUMENTS

| | | | |
|---|---|---|---|
| 3,556,043 A | | 1/1971 | Vayda |
| 3,916,817 A | * | 11/1975 | Kemp ................... F02M 35/09 |
| | | | 116/DIG. 25 |

(Continued)

FOREIGN PATENT DOCUMENTS

| | | |
|---|---|---|
| CN | 2188656 | 2/1995 |
| CN | 1192799 | 9/1998 |

(Continued)

OTHER PUBLICATIONS

International Patent Application No. PCT/US2018/057336, filed Oct. 24, 2018; International Search Report and Written Opinion dated Jan. 28, 2019; 11 pages.

(Continued)

*Primary Examiner* — Robert Clemente
(74) *Attorney, Agent, or Firm* — Mueting Raasch Group

(57) ABSTRACT

An air cleaner assembly with a restriction indicator (14) includes a housing (12) having an exterior surface around an interior volume. The housing includes a bore (42) extending through a portion of the exterior surface of the housing surrounded by a bore wall (38) protruding from the portion of the exterior surface. A receptacle wall of the housing is disposed around the bore wall and is radially spaced from the bore wall to form a channel (44) between the bore wall and the receptacle wall. A restriction indicator (14) measures a restriction in the interior volume and displays an indication (Continued)

of the restriction. The restriction indicator includes a stem (46) that is at least partially insertable into the bore that engages an inner surface of the bore wall. One or more tabs (52) of the restriction indicator are at least partially insertable in the channel and removably couple to the receptacle wall.

20 Claims, 16 Drawing Sheets

(56) References Cited

U.S. PATENT DOCUMENTS

| | | | |
|---|---|---|---|
| 4,184,376 A * | 1/1980 | Thomas | G01L 7/06 |
| | | | 116/DIG. 25 |
| 4,688,511 A * | 8/1987 | Gerlach | G01L 19/12 |
| | | | 116/271 |
| 5,606,311 A | 2/1997 | Polidan et al. | |
| 5,774,056 A | 6/1998 | Berry, III et al. | |
| 5,845,597 A * | 12/1998 | Karpal | C02F 1/001 |
| | | | 116/272 |
| 5,850,138 A | 12/1998 | Adams et al. | |
| 5,850,183 A | 12/1998 | Berry, III | |
| 6,161,417 A | 12/2000 | Nepsund | |
| 6,190,442 B1 | 2/2001 | Redner | |
| 6,268,791 B1 | 7/2001 | Ferris | |
| 6,307,466 B1 | 10/2001 | Ferris | |
| 6,327,902 B1 | 12/2001 | Berry, III et al. | |
| 6,383,243 B1 | 5/2002 | Yoder | |
| 6,443,010 B1 | 9/2002 | Scofield | |
| 6,604,486 B1 | 8/2003 | Krisko et al. | |
| 6,723,159 B2 | 4/2004 | Cheng | |
| 7,124,627 B2 | 10/2006 | Ciesielka et al. | |
| 7,137,303 B2 | 11/2006 | Janik et al. | |
| 7,360,433 B2 | 4/2008 | Janik et al. | |
| 7,412,896 B2 | 8/2008 | Janik et al. | |
| 7,414,207 B2 | 8/2008 | Heuthorst et al. | |
| 7,418,763 B2 | 9/2008 | Shaver et al. | |
| 7,470,360 B2 | 12/2008 | Berry, III et al. | |
| 7,562,579 B2 | 7/2009 | Hammerand et al. | |
| 7,777,143 B2 | 8/2010 | Heuthorst et al. | |
| 7,921,720 B2 | 4/2011 | Hammerand et al. | |
| 9,539,530 B2 | 1/2017 | Riccardella | |
| 2004/0187765 A1 | 9/2004 | Krisko et al. | |
| 2004/0216264 A1 | 11/2004 | Shaver et al. | |
| 2007/0256565 A1 | 11/2007 | Sohn | |
| 2008/0072687 A1 | 3/2008 | Hammerand et al. | |
| 2009/0071392 A1 | 3/2009 | Berry, III et al. | |
| 2010/0084347 A1* | 4/2010 | Wilder | C02F 1/003 |
| | | | 210/717 |
| 2015/0059584 A1 | 3/2015 | Steins et al. | |
| 2018/0345196 A1 | 12/2018 | Campbell et al. | |

FOREIGN PATENT DOCUMENTS

| | | |
|---|---|---|
| CN | 201428537 | 3/2010 |
| DE | 197 51 942 A1 | 5/1999 |
| EP | 0 229 893 A2 | 7/1987 |
| WO | 2018/226736 A2 | 12/2018 |
| WO | 2018/226736 A3 | 12/2018 |

OTHER PUBLICATIONS

International Patent Application No. PCT/US2018/057336, filed Oct. 24, 2018; International Preliminary Report on Patentability, dated Apr. 28, 2020; 7 pages.

* cited by examiner

ND RESTRICTION INDICATOR

The present application is the § 371 U.S. National Stage of International Application No. PCT/US2018/057336, filed 24 Oct. 2018, which claims the benefit of U.S. Provisional Application Ser. No. 62/576,263, filed Oct. 24, 2017, entitled AIR CLEANER ASSEMBLY WITH RESTRICTION INDICATOR, the disclosures of which are incorporated by reference in their entireties.

The present disclosure relates to air cleaner assemblies and, in particular, relates to air cleaner assemblies with a removable restriction indicator.

Systems utilizing fluid during operation, such as modern internal combustion engine systems, often include fluid filters to ensure proper or reliable performance. For example, internal combustion engine systems may include air cleaners containing an air filter to remove dirt and other particulates from engine intake air before combustion. As a consequence of their proper operation, these filters collect particulates over time and increasingly restrict the flow of air or fuel into engines. Eventually, the filters may become more restrictive than desirable for fuel efficiency or other performance criteria and may require replacement.

To facilitate timely filter replacement, some systems include filter monitoring devices to provide an indication of the filter restriction to users. For example, a restriction indicator may monitor levels of vacuum pressure that result from air flow through the associated filter in the air cleaner. The restriction indicator may be calibrated to detect when particular vacuum pressure levels occur and provide an indication of the level. Some restriction indicators provide a visible indication of the restriction.

Restriction indicators can be difficult to install or service. Some restriction indicators are removably coupled to a housing of the air cleaner by a threaded connection, which requires precise alignment of threads to function properly and multiple turns. Some indicators are coupled by a quick-connect fitting, which may easier to install or remove than a threaded connection but may protrude far from the housing of the air cleaner to accommodate the quick-connect mechanism and be more easily damaged. Other indicators may require an adaptor to fit onto the housing of the air cleaner. Furthermore, restriction indicators may be difficult for users to see, at times, due to their placement on the air cleaner housing and limited functionality.

There remains a need for improved visual restriction indicators having connection features that facilitate the ease of installation and service, as well as improved visibility for users.

Various aspects of the present disclosure relate to air cleaner assemblies with a removable restriction indicator. In one or more embodiments, the removable restriction indicator is mounted to a receptacle on a housing of an air cleaner in a manner that is easy to install and service. The restriction indicator may be installed by inserting a portion of the restriction indicator into the receptacle of the air cleaner housing. During installation of one or more embodiments of the restriction indicator as described herein, a stem of the restriction indicator may be inserted into a bore of the air cleaner housing and sealed thereto, and one or more tabs of the restriction indicator may engage a corresponding aperture to secure the restriction indicator to the housing. When mounted, the restriction indicator may have a low profile. The restriction indicator may be a visual restriction indicator with a wide viewing angle.

In one aspect, the present disclosure relates to an air cleaner assembly including a housing having an exterior surface around an interior volume. The housing includes a bore extending through a portion of the exterior surface of the housing along an insertion axis and surrounded by a bore wall protruding from the portion of the exterior surface along the insertion axis. The housing also includes a receptacle wall around the bore wall along the insertion axis and radially spaced from the bore wall to form a channel between the bore wall and the receptacle wall. The air cleaner assembly also includes a restriction indicator configured to measure a restriction in the interior volume when coupled to the housing and to display an indication of the restriction. The restriction indicator includes an indication element configured to display the indication of the restriction. The restriction indicator also includes a stem at least partially insertable into the bore along the insertion axis and configured to engage an inner surface of the bore wall when disposed therein. The restriction indicator further includes one or more tabs at least partially insertable in the channel between the bore wall and the receptacle wall and configured to facilitate removably coupling the restriction indicator to the housing.

It is to be understood that both the foregoing general description and the following detailed description present embodiments of the subject matter of the present disclosure and are intended to provide an overview or framework for understanding the nature and character of the subject matter of the present disclosure as it is claimed.

DETAILED DESCRIPTION

The present disclosure relates to an air cleaner assembly with a removable restriction indicator. Although reference is made herein to an air cleaner assembly for internal combustion engines, the air cleaner assembly may be used with any system in which monitoring fluid pressure may be desirable. Various other applications will become apparent to those of ordinary skill in the art having the benefit of the present disclosure.

The air cleaner assembly of the present disclosure provides a restriction indicator that may display visual information to users about when a filter needs service. The restriction indicator may be removably mounted to a housing of an air cleaner. The restriction indicator may be mounted by at least partially inserting a stem of the restriction indicator into a bore of the air cleaner housing. One or more tabs of the restriction indicator may engage one or more apertures of the housing to provide a snap-fit connection, which may facilitate quick installation or removal for service, particularly compared to other restriction indicators using a threaded connection. One or more rails may guide a tab toward a corresponding aperture during mounting to facilitate ease of installation. When mounted, the restriction indicator may have a low profile, which may mitigate damage to the restriction indicator by external forces.

The restriction indicator may show discrete states of the filter, such as no restriction, moderate restriction, and substantial restriction. The restriction indicator may employ a low number of calibration elements or only one calibration element to facilitate ease of assembly and calibrating for different applications. The restriction indicator may include a lock pin in a follower cam design, which may provide more accurate calibration and measurement points. The restriction indicator may include large indication regions 108, 110, 112 (FIG. 9) to provide a wide viewing angle of the restriction indication.

Figure 1:
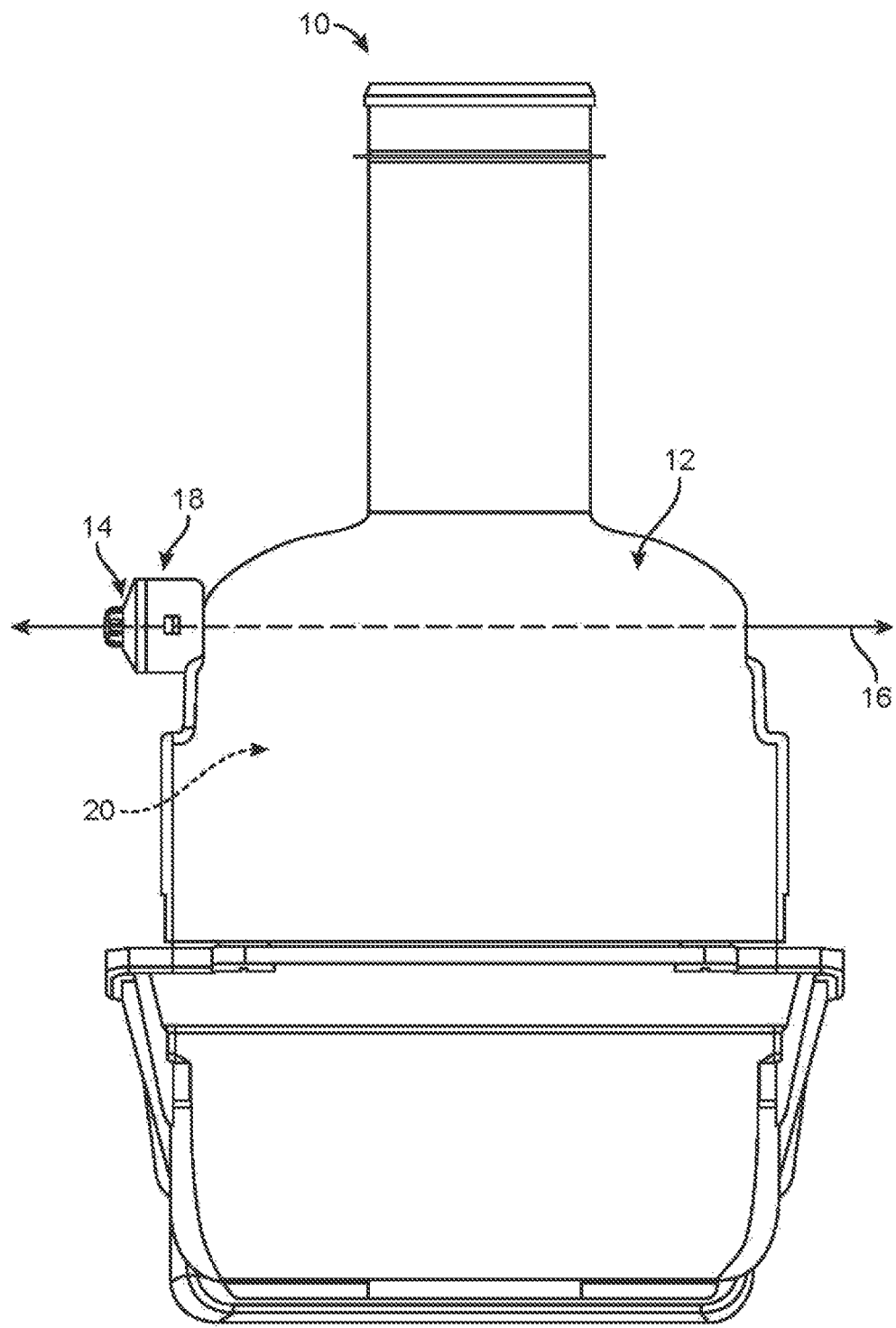
FIG. 1 is an overhead view of an air cleaner assembly including a housing and a restriction indicator mounted to the housing according to some embodiments of this disclosure.

FIG. 1 shows one illustrative embodiment of an air cleaner assembly 10 including a housing 12 and a restriction indicator 14, for example, a visual restriction indicator, mounted to the housing along an axis 16. The axis 16 may be described as an insertion axis or longitudinal axis. In particular, the restriction indicator 14 may be coupled to a receptacle 18 of the housing 12 along the axis 16. The restriction indicator 14 and receptacle 18 may be designed to couple together using a low force directed along the axis 16. For example, a maximum installation force to install the restriction indicator 14 may be less than or equal to about 20 lbs., about 15 lbs., about 12 lbs., about 11 lbs., about 10 lbs., about 9 lbs., about 8 lbs., or about 5 lbs. The maximum installation force may be in a range of about 15 lbs. to about 5 lbs., about 12 lbs. to about 8 lbs., or about 11 lbs. to about 9 lbs. Preferably, the maximum installation force is in a range of about 11 lbs. to about 9 lbs. Preferably, the maximum installation force is equal to about 10 lbs.

The restriction indicator 14 may measure a restriction in an interior volume 20 defined by the housing 12 when the restriction indicator is coupled to the housing. An indication of the restriction may be displayed by the restriction indicator 14 that is visible to users.

The air cleaner assembly 10 may include a filter (not shown) for engine intake air in an internal combustion engine system. Part of the restriction indicator 14 may be exposed to the ambient environment and part of the restriction indicator may be exposed to the environment of the interior volume 20 to measure a pressure difference between the two environments. The portion of the restriction indicator 14 exposed to the environment of the interior volume 20 may be disposed downstream of the filter to detect vacuum pressure, or negative pressure, between the filter and an air intake manifold. When the filter is unloaded, or clean, there may be little or no vacuum pressure in the interior volume 20 of the air cleaner assembly 10 detected by the restriction indicator 14. Typically, as the filter becomes more loaded, or dirty, more vacuum pressure builds in the interior volume 20 of the air cleaner assembly 10 that may be detected by the restriction indicator 14.

The restriction indicator 14 may be calibrated for various applications. In some embodiments, for some internal combustion engine applications, the restriction indicator 14 may be calibrated to associate about 100% loading of the filter with a vacuum pressure, which may vary depending on the particular application of the restriction indicator. In some embodiments, the vacuum pressure associated with about 100% loading of the filter is equal to between about 15 and about 40 inches of $H_2O$ (water).

Figure 2:
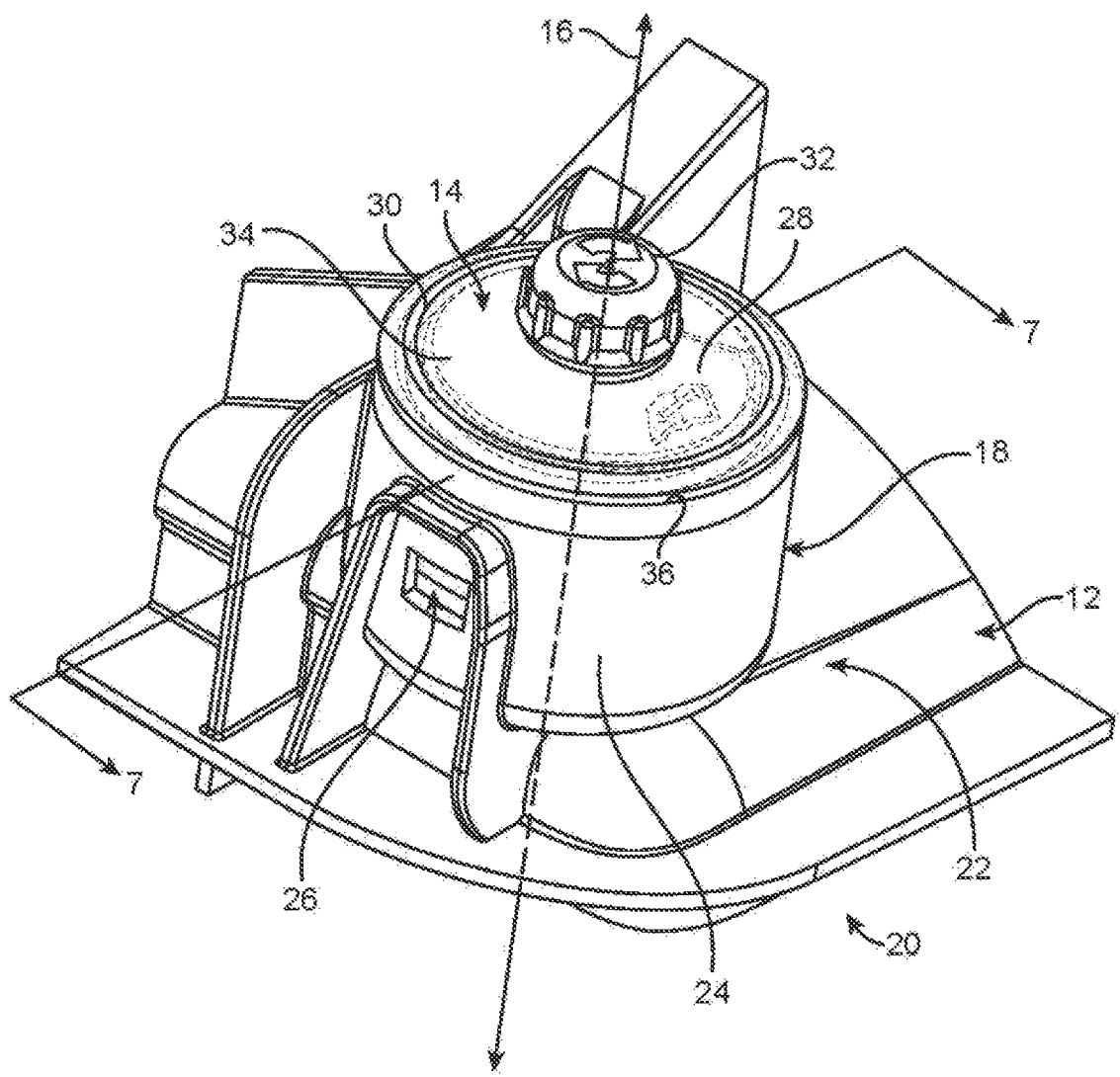
FIG. 2 is a perspective view of a portion of the air cleaner assembly of FIG. 1 with the restriction indicator mounted to the housing.

FIG. 2 shows part of the housing 12 and the restriction indicator 14 mounted to the housing in a perspective view after the restriction indicator 14 has been inserted along the axis 16 into the receptacle 18 of the housing 12. As used herein, the axis 16 may be defined as parallel to a longitudinal direction and orthogonal to a lateral direction. The restriction indicator 14 may display an indication of the restriction when mounted to the receptacle 18 of the housing 12. Although the axis 16 as shown extends through a center of the restriction indicator 14 and the receptacle 18, in one or more embodiments, the axis 16 need not necessarily extend through the center and/or may be tilted.

The housing 12 may be disposed around, or at least partially enclose, the interior volume 20 and may include an exterior surface 22. At least a portion of the receptacle 18 may protrude from the exterior surface 22 along the axis 16.

The receptacle 18 of the housing 12 may include a receptacle wall 24. The receptacle wall 24 may protrude from the exterior surface 22 along the axis 16. When mounted, at least a portion of the restriction indicator 14 may be disposed interior to the receptacle wall 24.

The receptacle wall 24 may define one or more apertures 26 that extend through the receptacle wall. In FIG. 2, only one aperture 26 is visible. Each aperture 26 may receive a portion of the restriction indicator 14 to facilitate securement of the restriction indicator 14 to the receptacle 18 of the housing 12.

The restriction indicator 14 may include an indication element 28, which may be externally visible to users through an at least partially, or entirely, clear cap 30 that covers the indication element. A reset knob 32 may be coupled to the indication element 28. The cap 30 may be disposed between the indication element 28 and the reset knob 32.

The cap 30 may extend around the axis 16 to cover the indication element 28. The cap 30 may have a convex exterior surface 82 (FIG. 6) that magnifies the indication of the restriction displayed on the indication element 28. The indication of the restriction may be an icon, color, or other visual representation of a level of restriction of the air filter.

The indication element 28 may be capable of displaying a plurality of indications of restriction. In some embodiments, the indications of restriction may include one or more colors, such as red, yellow, and green. Red may indicate to users that filter replacement service may be needed (substantial vacuum pressure). For example, the red color may indicate almost or about 100% loading of the filter. Yellow may indicate to users that a filter replacement service may be needed soon (moderate vacuum pressure). For example, the yellow color may indicate about 75% loading of the filter. Green may indicate to users that there may be no substantial restriction in the filter and filter operation may be good (mild to no vacuum pressure). Each indication may be selectively displayed to correspond to the restriction of the air filter based on detected vacuum pressure.

The indication element 28 may rotate in a single direction about the axis 16 in response to increasing vacuum pressure. The indication displayed may depend on the amount that the indication element 28 has rotated. A mask 34 may be disposed between the indication element 28 and the cap 30. A portion of the indication element 28 may be covered by a mask 34, and a portion of the indication element may be visible through a window 113 (FIG. 9) in the mask.

In some embodiments, at least a quarter of the indication element 28 may be visible through the window 113 (FIG. 9) of the mask 34. In other words, an arc segment of the indication element 28 that is greater than or equal to about 90 degrees may be visible through the window 113 of the mask 34. In some embodiments, at least a third of the indication element 28 (greater than or equal to about 120 degrees) may be visible through the window 113 of the mask 34. More visibility of the indication element 28 through the window 113 of the mask 34 may provide greater the visibility of the indication restriction for users.

The restriction indicator 14 may have a low profile when mounted. In particular, a portion of the restriction indicator 14 may extend along the axis 16 a limited distance beyond an upper edge 36 of the receptacle 18. The upper edge 36 may be defined by the receptacle wall 24 of the receptacle 18 (see also FIG. 3). The low profile of the restriction indicator 14 may be characterized by a maximum distance or height 64 (FIG. 6) measured from the upper edge 36 of the receptacle wall 24, or an outer shoulder 66 (FIG. 6) of the restriction indicator, to the top of the restriction indicator, which may be the top of the reset knob 32.

In some embodiments, the maximum height 64 (FIG. 6) that the restriction indicator 14 extends along the axis 16 may be less than or equal to about 30 mm, about 25 mm, about 23 mm, about 22 mm, about 21 mm, about 20 mm, about 19 mm, about 18 mm, about 17 mm, about 15 mm, about 10 mm, or less. Preferably, the maximum height 64 is less than or equal to about 23 mm. The maximum height 64 may be in a range of about 30 mm to about 10 mm, about 25 mm to about 15 mm, about 23 mm to about 17 mm, about 22 mm to about 18 mm, or about 21 mm to about 19 mm. Preferably, the maximum height 64 is in a range of about 23 mm to about 17 mm (about 20 mm±about 3 mm). In some embodiments, the maximum height 64 may be equal to about 20 mm.

Figure 3:
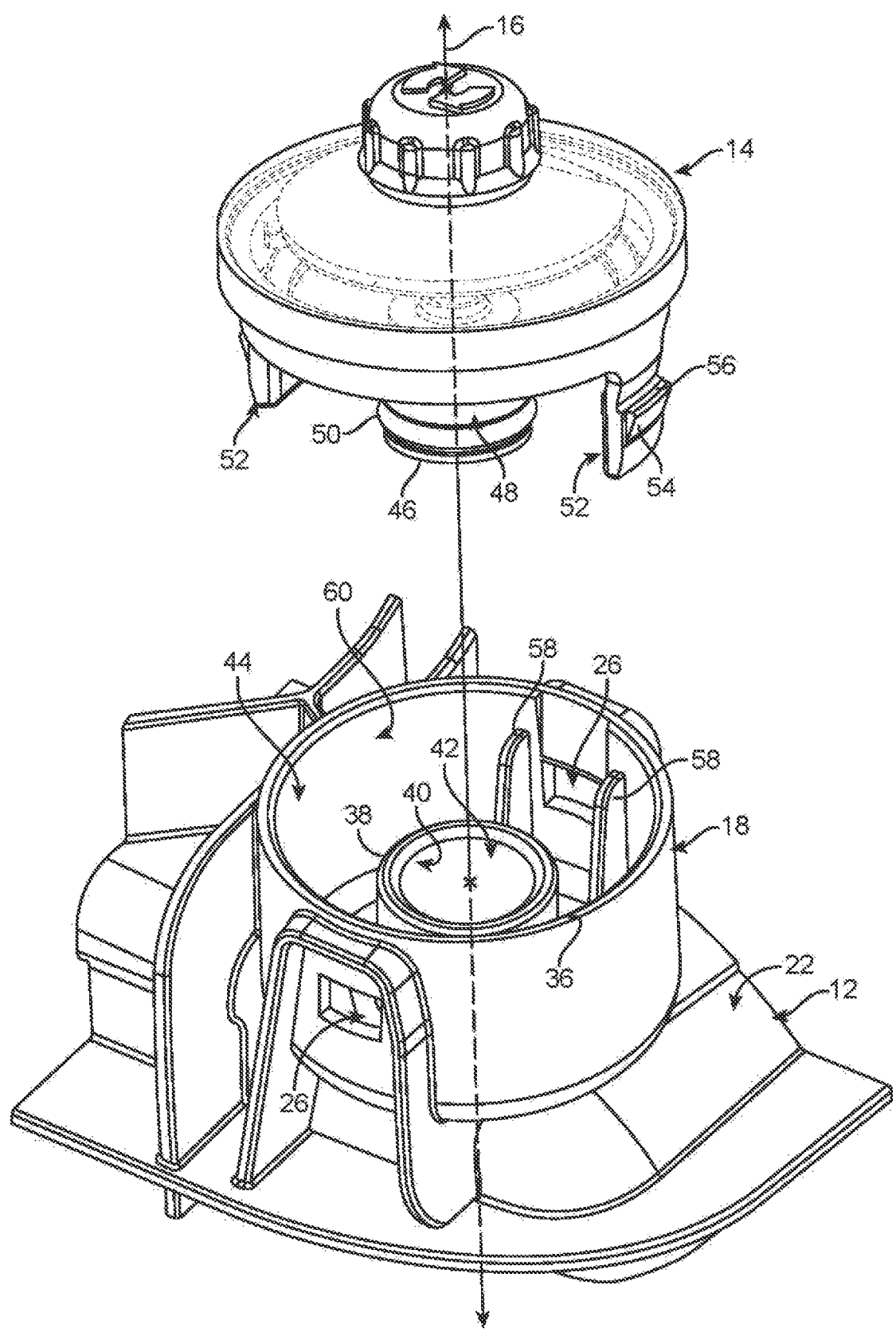
FIG. 3 is a perspective view of the housing and the restriction indicator of FIG. 2 with the restriction indicator separated along an axis from the housing and rotated 90 degrees about the axis.

FIG. 3 shows the receptacle 18 of the housing 12 separated from the restriction indicator 14 along the axis 16 with the restriction indicator being rotated about 90 degrees about the axis from a mounting orientation (see FIG. 2). As can be seen, the receptacle 18 of the housing 12 may include a bore wall 38 having an inner surface 40 around a bore 42. The bore wall 38 may protrude from the exterior surface 22 of the housing 12 along the axis 16. The bore wall 38 may surround the bore 42 along the axis 16. The bore 42 may extend along the axis 16 through the exterior surface 22 of the housing 12.

The inner surface 40 may define the bore 42. The shape of the inner surface 40 may include a cylindrical wall. A cross-sectional shape of the inner surface 40 may include a circle. The cross-section of the inner surface 40 may be defined by an intersection of a plane orthogonal to the axis 16 and the inner surface 40. The circular cross-sectional shape of the inner surface 40 may be centered at the axis 16.

The receptacle wall 24 may be disposed around the bore wall 38. The receptacle wall 24 may protrude from the exterior surface 22 a distance along the axis 16 (for example, the distance between the exterior surface and the upper edge 36 of the receptacle wall), and such distance may be the same or greater than a distance that the bore wall 38 protrudes from the exterior surface along the axis 16. In other words, the receptacle wall 24 may be taller than the bore wall 38. In another manner of characterizing the relationship between the receptacle wall 24 and the bore wall 38, the bore wall may be located between a plane occupied or defined by the upper edge 36 of the receptacle wall 24 and the exterior surface 22 of the housing 12.

The receptacle wall 24 may be radially spaced from the bore wall 38 to form a channel 44 between the bore wall and the receptacle wall. The channel 44 may receive a portion of the restriction indicator 14 when mounted to the receptacle 18. The portion of the restriction indicator 14 received in the channel 44 may engage the receptacle wall 24 proximate or adjacent to the apertures 26 to secure the restriction indicator 14 to the receptacle 18 of the housing 12.

More than one aperture 26 may be formed in the receptacle wall 24. In some embodiments, the number of apertures 26 extending through the receptacle wall 24 may be two, three, four, or more. Preferably, the receptacle wall 24 includes two apertures 26. One aperture 26 may be disposed opposite another aperture 26 across the axis 16. The channel 44 may be positioned proximate to one or more apertures 26.

The restriction indicator 14 may include a stem 46 that extends along the axis 16 in a downward direction (toward the housing 12 as shown in FIG. 3). The stem 46 may be at least partially insertable into the bore 42 along the axis 16. The stem 46 may or may not engage the inner surface 40 of the bore wall 38 directly when the stem 46 is at least partially disposed in the bore 42 defined by the bore wall 38.

The stem 46 may have an outer surface 48. The shape of the outer surface 48 may include a cylindrical wall. A cross-sectional shape of the outer surface 48 may include a circle. The cross-section of the outer surface 48 may be defined by an intersection of a plane orthogonal to the axis 16 and the outer surface 48. The circular cross-sectional shape of the outer surface 48 may be centered at the axis 16.

The stem 46 may be defined by a maximum width 76 (FIG. 6) orthogonal to the axis 16. In particular, the outer surface 48 may define the maximum width 76. The maximum width 76 may be defined as a diameter when the outer surface 48 has a circular cross-sectional shape. Preferably, the maximum width 76 of the stem 46 is less than or equal to a maximum width defined by the inner surface 40 of the bore wall 38 to facilitate insertion of the stem 46 into the bore 42.

In some embodiments, the maximum width 76 of the stem 46 may be less than or equal to about 17 mm, about 16 mm, about 15.5 mm, about 15 mm, about 14.5 mm, about 14 mm, about 13.5 mm, about 13 mm, or about 12 mm. Preferably, the maximum width 76 is less than or equal to about 16 mm. The maximum width 76 may be in a range of about 17 mm to about 12 mm, about 16 mm to about 13 mm, about 15.5 mm to about 13.5 mm, or about 15 mm to about 14 mm. Preferably, the maximum width 76 is in a range of about 15.5 mm to about 13.5 mm. Preferably, the maximum width 76 is equal to about 14.5 mm. In some embodiments, the tolerance of any of these values may be equal to about +/−0.005 inches (0.13 mm).

A sealing ring 50 may be disposed on the stem 46 of the restriction indicator 14. In particular, the sealing ring 50 may be disposed around the stem 46. The sealing ring 50 may facilitate engagement, or coupling, of the stem 46 to the inner surface 40 of the bore wall 38. In particular, the sealing ring 50 may have a maximum width that is equal to or greater than the maximum width 76 (FIG. 6) of the stem 46. The sealing ring 50 may form a seal between the outer surface 48 of the stem and the inner surface 40 of the bore wall 38 when the restriction indicator 14 is at least partially inserted into the bore 42. The sealing ring 50 may be formed of any compressible material suitable for forming an airtight seal when subjected to pressures of the particular application for which the restriction indicator 14 is designed. In some embodiments, the sealing ring 50 may be any suitable commercially available O-ring.

One or more tabs 52 may be aligned with (for example, extending parallel to) the axis 16 in the same downward direction as the stem 46. The tabs 52 may also be described as "legs" of the restriction indicator 14. The tabs 52 may be at least partially insertable in the channel 44 between the bore wall 38 and the receptacle wall 24. The tabs 52 may be removably coupled to the receptacle wall 24 to secure the restriction indicator 14 to the housing 12. In particular, the tabs 52 may be deflectable to couple or uncouple to the receptacle wall 24. The tabs 52 may be formed of a resilient material capable of deflecting from a nominal shape in response to a lateral force and returning to the nominal shape in the absence of the lateral force.

A detent 54 may be disposed on any or all tabs 52. Each detent 54 may be received in an aperture 26 of the receptacle wall 24 to facilitate securing the restriction indicator 14 to the housing 12. In particular, a detent shoulder 56 may be disposed on any or all detents 54 that, when mounted, may engage an upper edge 84 (FIG. 8) of the corresponding aperture 26 in the receptacle wall 24. In some embodiments, the number of detents 54 received by the apertures 26 when the restriction indicator 14 is coupled to the housing 12 may be equal to one, two, three, four, or more detents. For example, in some embodiments, the restriction indicator 14 may include at most two detents (for example, one for each tab 52 when the restriction indicator has two tabs).

The restriction indicator 14 may be quickly and simply installed into the receptacle 18 of the housing 12. The restriction indicator 14 may be coupled to the housing 12 by inserting the stem 46 at least partially into the bore 42 using a linear motion along the axis 16 to form a seal between the stem 46 and the bore wall 38 and to secure the one or more tabs 52 to the receptacle wall 24. The sealing ring 50 may provide the seal, and the tabs 52 may form a snap-fit connection between the restriction indicator 14 and the receptacle wall 24 of the housing 12. In this manner, the restriction indicator 14 may be conveniently nested into the receptacle 18 while achieving a low profile.

An inner surface 60 of the receptacle wall 24 may define an outer boundary of the channel 44. The shape of the inner surface 60 may include a cylindrical wall. A cross-sectional shape of the inner surface 60 may include a circle. The cross-section of the inner surface 60 may be defined by an intersection of a plane orthogonal to the axis 16 and the inner surface 60. The circular cross-sectional shape of the inner surface 60 may be centered at the axis 16.

One or more guide rails 58 may be disposed in the channel 44 to facilitate installation of the restriction indicator 14.

Each guide rail 58 may be disposed proximate or adjacent to one of the apertures 26. Each aperture 26 may be proximate or adjacent to one, two, three, four, or more guide rails 58. Each guide rail 58 may extend into the channel 44 from the inner surface 60 of the receptacle wall 24. The guide rails 58 may be integrally formed with the receptacle wall 24. The guide rails 58 may have a maximum height measured from the exterior surface 22 of the housing 12 that is less than or equal to a maximum height of the receptacle wall 24. In another manner of characterizing the relationship between the receptacle wall 24 and the guide rails 58, the guide rails may be located between a plane occupied or defined by the upper edge 36 of the receptacle wall 24 and the exterior surface 22 of the housing 12.

A tab 52 may be guided by one or more guide rails 58 as the restriction indicator 14 is at least partially inserted into the receptacle 18. Each tab 52 may be guided by one, two, three, four, or more guide rails 58. In some embodiments, any or all tabs 52 may each be guided by at least two guide rails 58. Preferably, each tab 52 is guided by two guide rails 58 spaced from one another. When the restriction indicator 14 is coupled to the housing 12, the tab 52 may fit between the space between the two guide rails 58.

Figure 4:
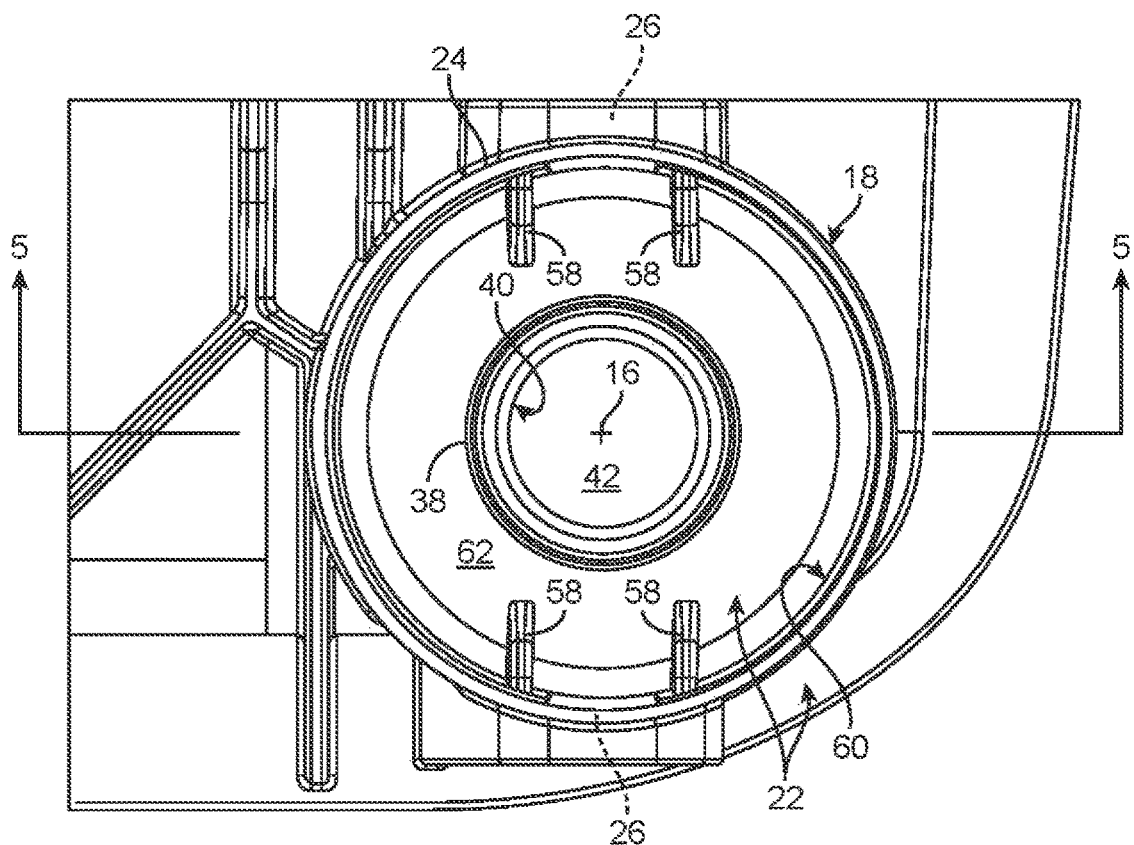
FIG. 4 is an overhead view of the housing of FIG. 3 in line with the axis.

FIG. 4 shows the receptacle 18 of the housing 12 in an overhead view in the line with the axis 16. As illustrated, the bore 42 extending through the exterior surface 22 of the housing 12 is surrounded by the inner surface 40 of the bore wall 38. As shown, the inner surface 40 may have a circular cross-sectional shape centered at the axis 16.

The channel 44 may be proximate or adjacent to the exterior surface 22 of the housing 12 between the bore wall 38 and the laterally spaced inner surface 60 of the receptacle wall 24. The exterior surface 22 of the housing 12 may include a portion 62 that serves as a floor of the receptacle 18, which may define a laterally extending boundary of the channel 44 between the bore wall 38 and the receptacle wall 24.

Each guide rail 58 may extend into the channel 44 from the inner surface 60 proximate or adjacent to one of the apertures 26. In some embodiments, two guide rails 58 may be proximate or adjacent to any or all apertures 26. Preferably, the receptacle 18 of the housing 12 includes two apertures 26 and four guide rails 58.

Figure 5:
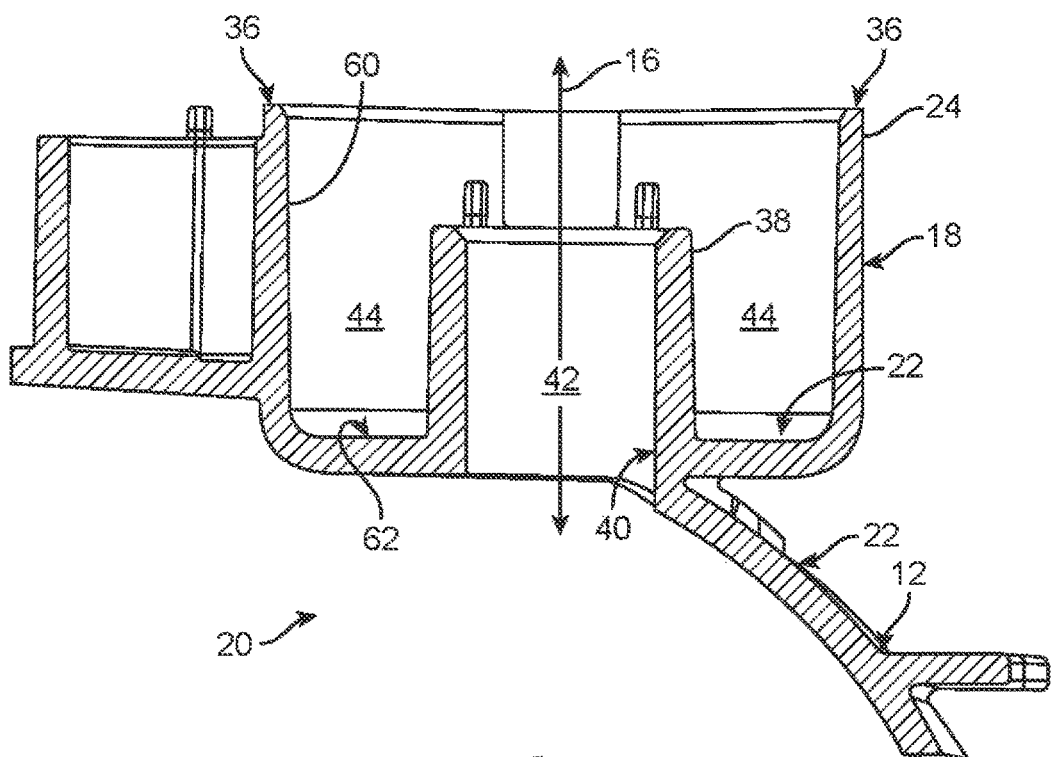
FIG. 5 is a cross-sectional elevation view of the housing of FIG. 4 along line 5-5.
Figure 6:
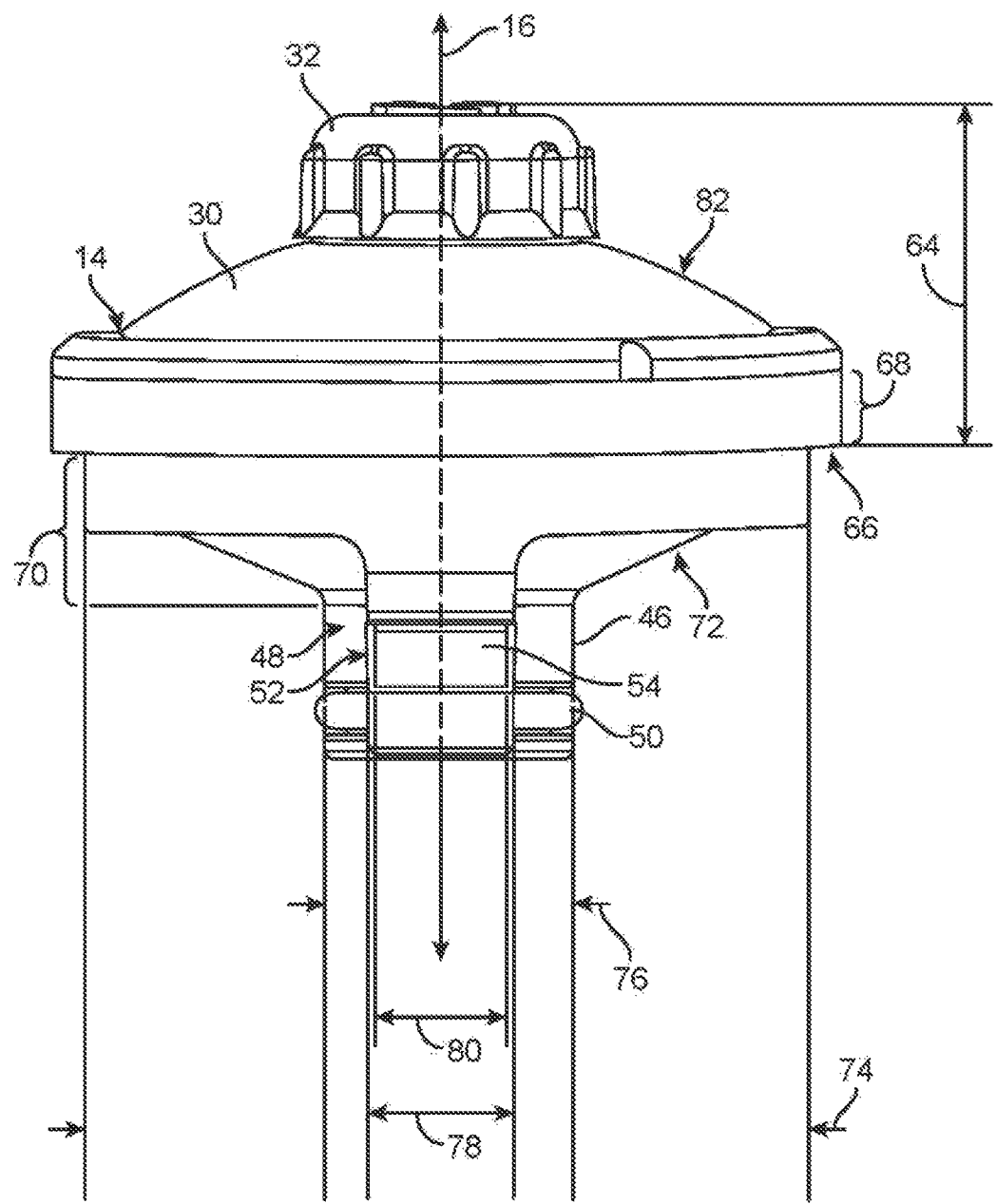
FIG. 6 is an elevation view of the restriction indicator of FIG. 3.

FIG. 5 shows the receptacle 18 of the housing 12 in a cross-sectional elevation view along line 5-5 in FIG. 4. In the rotational orientation of the restriction indicator 14 about the axis 16, as shown in FIG. 6, the restriction indicator may be coupled to the receptacle 18 of the housing 12 using a linear motion along the axis. The bore 42 defined by the inner surface 40 of the bore wall 38 may be proximate or adjacent to the interior volume 20 defined by the housing 12. The bore 42 extending through the portion 62 of the exterior surface 22 of the housing 12 may be in fluid communication with the interior volume 20 to allow vacuum pressure in the interior volume to be measured via the bore.

The receptacle wall 24 and the bore wall 38 may extend or protrude from the portion 62 of the exterior surface 22 in a direction that is aligned to the axis 16 (for example, parallel to). The inner surface 60 of the receptacle wall 24 may terminate at the upper edge 36. The height of the bore 42 along the axis 16 may be defined by the bore wall 38 surrounding the bore.

A maximum height 64 of the restriction indicator 14 may be measured from the upper edge 36 of the receptacle wall 24 to the top of the reset knob 32 when the restriction indicator 14 is coupled to the housing 12. The maximum height 64 of the restriction indicator 14 may also be measured between an outer shoulder 66 of a lower collar portion 68 of the restriction indicator 14 and the top of the reset knob 32. These measurements of the maximum height 64 may be equivalent, or about the same, because the outer shoulder 66 may engage the upper edge 36 of the receptacle wall 24 when the restriction indicator 14 is coupled to the housing 12.

A lower shell portion 70 of the restriction indicator 14 may extend between the stem 46 and the lower collar portion 68. The stem 46, lower collar portion 68, and lower shell portion 70 may be part of an indicator housing 72. In particular, the stem 46, lower collar portion 68, and lower shell portion 70 may be integrally formed as an indicator housing 72. The stem 46 and the tabs 52 may each extend downwardly from the lower shell portion 70 of the indicator housing 72.

The lower shell portion 70 may be defined by a maximum width 74 orthogonal to the axis 16. The maximum width 74 may be defined as a diameter when the lower shell portion 70 has a circular cross-sectional shape. Preferably, the maximum width 74 of the lower shell portion 70 is less than or equal to a maximum width defined by the inner surface 60 of the receptacle wall 24 to facilitate insertion of the lower shell portion 70 of the restriction indicator 14 into the receptacle 18 of the housing 12.

In some embodiments, the maximum width 74 of the lower shell portion 70 may be less than or equal to about 44 mm, about 43 mm, about 42.9 mm, about 42 mm, about 41.9 mm, about 41 mm, about 40.9 mm, about 40 mm, about 39 mm, or about 38 mm. Preferably, the maximum width 74 is less than or equal to about 43 mm. The maximum width 74 may be in a range of about 44 mm to about 38 mm, about 43 mm to about 39 mm, about 42.9 mm to about 40.9 mm, or about 42 mm to about 41 mm. Preferably, the maximum width 74 is in the range between about 42.9 and about 40.9 mm. Preferably, the maximum width 74 is equal to about 41.9 mm. In some embodiments, the tolerance of any of these values may be equal to about +/−0.005 inches (0.13 mm).

A maximum width 76 of the stem 46 orthogonal to the axis 16 may be defined by the outer surface 48 of the stem without the sealing ring 50. In other embodiments, the maximum width 76 of the stem 46 may include the width of the sealing ring 50. The maximum width 76 may allow a space between the stem 46 and the bore wall 38 when the stem is inserted into the bore 42 to accommodate the sealing ring 50 in a compressed state. In this manner, the stem 46 may be described as coupled or sealed indirectly to the bore wall 38.

Each of the tabs 52 may be defined by a maximum width 78 orthogonal to the axis 16 in view of FIG. 6 (for example, a radial width as measured relative to axis 16). Preferably, the maximum width 78 of the tab 52 is less than or equal to a maximum width defined by a space between corresponding guide rails 58 to facilitate fitting the tab between the guide rails.

In some embodiments, the maximum width 78 of any or all tabs 52 may be less than or equal to about 11 mm, about 10 mm, about 9.7 mm, about 9 mm, about 8.7 mm, about 8 mm, about 7.7 mm, about 7 mm, or about 6 mm. Preferably, the maximum width 78 is less than or equal to about 10 mm. The maximum width 78 may be in a range of about 11 mm to about 6 mm, about 10 mm to about 7 mm, about 9.7 mm to about 7.7 mm, or about 9 mm to about 8 mm. Preferably, the maximum width 78 is in the range between about 9.7 to about 7.7 mm. Preferably, the maximum width 78 is equal to about 8.7 mm. In some embodiments, the tolerance of any of these values may be equal to about +/−0.005 inches (0.13 mm).

The detent 54 of any or all tabs 52 may have a maximum width 80 extending orthogonal to the axis 16 in view of FIG. 6 (for example, a radial width as measured relative to axis 16), which may be the same or different than the maximum width 78 of the corresponding tab. Preferably, the maximum width 80 of the detent 54 is less than or equal to a maximum width defined by a corresponding aperture 26 (FIG. 3) to facilitate fitting the detent into the aperture.

In some embodiments, the maximum width 80 of any or all detents 54 may be less than or equal to about 10 mm, about 9 mm, about 8.6 mm, about 8 mm, about 7.6 mm, about 7 mm, about 6.6 mm, about 6 mm, or about 5 mm. Preferably, the maximum width 80 is less than or equal to about 9 mm. The maximum width 80 may be in a range of about 10 mm to about 5 mm, about 9 mm to about 6 mm, about 8.6 mm to about 6.6 mm, or about 8 mm to about 7 mm. Preferably, the maximum width 80 is in a range of about 8.6 mm to about 6.6 mm. Preferably, the maximum width 80 is equal to about 7.6 mm. In some embodiments, the tolerance of any of these values may be equal to about +/−0.005 inches (0.13 mm).

The cap 30 of the restriction indicator 14 may magnify the indication of restriction. In particular, the cap 30 may have a convex exterior surface 82, or dome, which may magnify the indication of restriction for users viewing the restriction indicator 14 from a wide variety of angles—not only from a head-on view.

Figure 7:
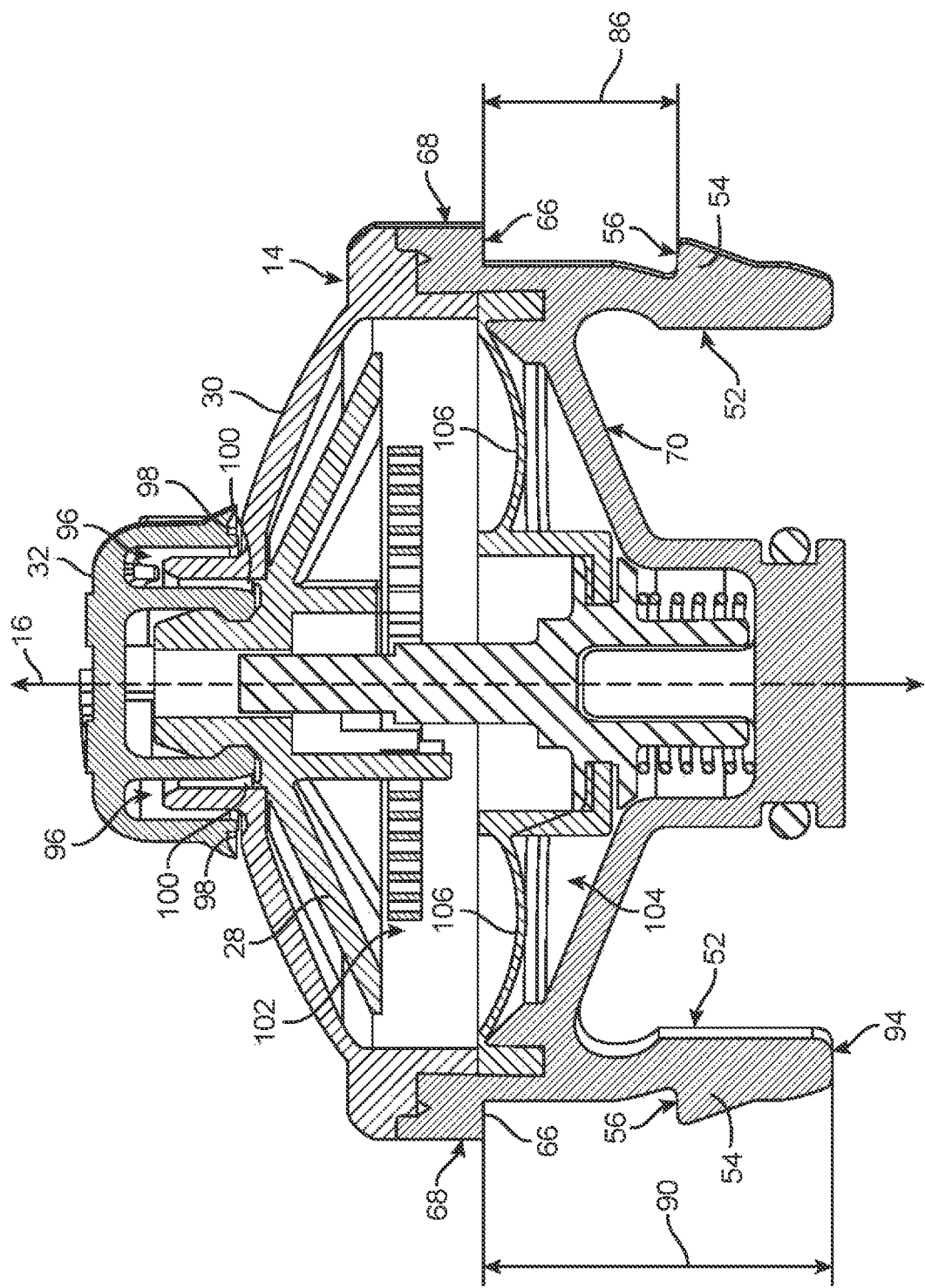
FIG. 7 is a cross-sectional elevation view of the restriction indicator of FIG. 3 along line 7-7 in FIG. 2.
Figure 8:
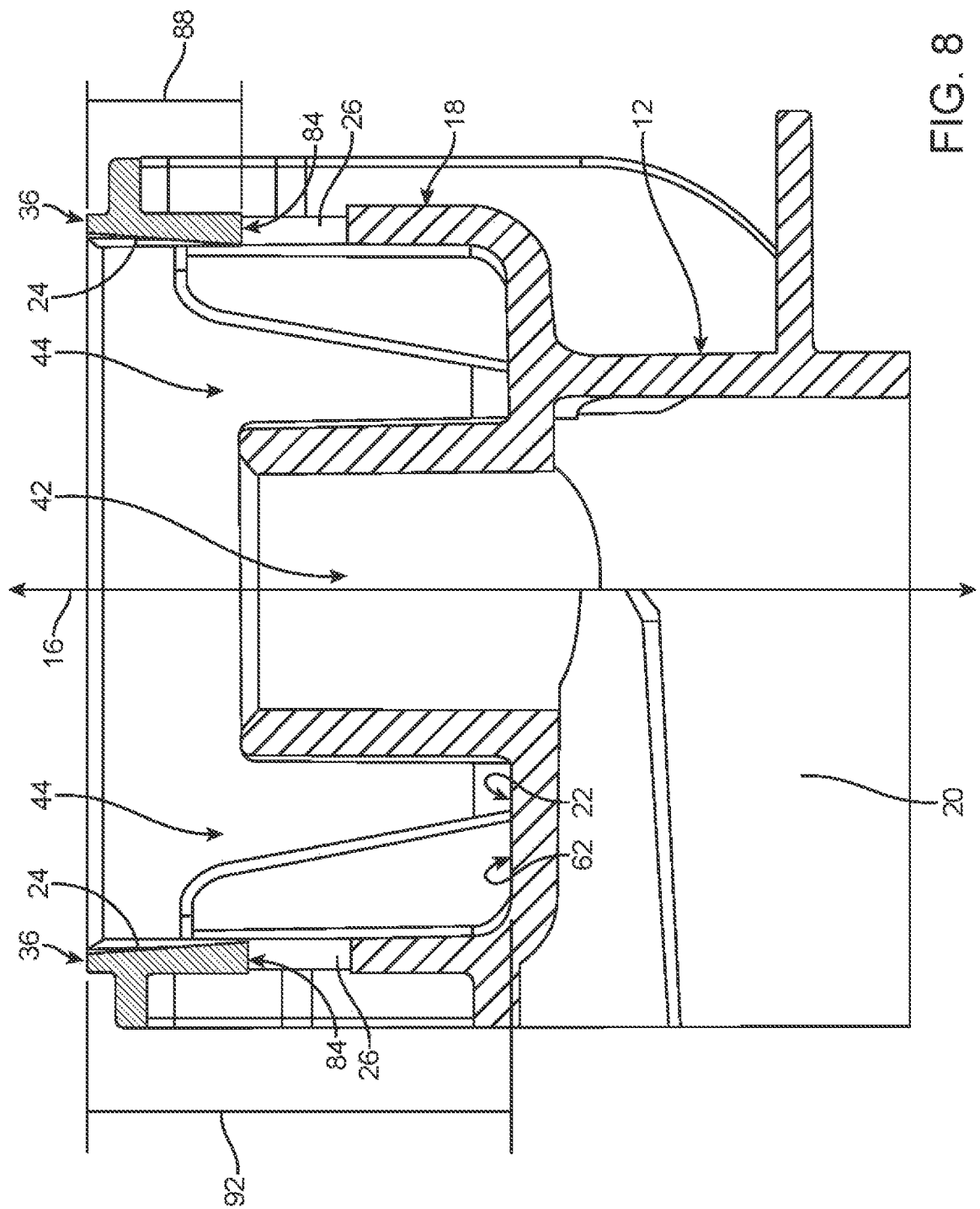
FIG. 8 is a cross-sectional elevation view of the housing of FIG. 4 along line 7-7 in FIG. 2.

FIG. 7 shows the restriction indicator 14 in a cross-sectional elevation view along line 7-7 in FIG. 2 in an orientation capable of being coupled to the receptacle 18 of the housing 12, as shown in FIG. 8 in a cross-sectional elevation view also along line 7-7, with a linear movement along the axis 16. As illustrated, the apertures 26 are disposed opposite one another across the axis 16, and the tabs 52 are disposed opposite one another across the axis 16.

The restriction indicator 14 may define a first distance 86 (FIG. 7) to facilitate coupling to the receptacle wall 24 of the housing 12. The first distance 86 may be aligned with (for example, extend parallel to) the axis 16 and be measured as the distance between the outer shoulder 66 of the lower collar portion 68 and the detent shoulder 56 of the detent 54. The receptacle wall 24 may define a second distance 88 (FIG. 8) to facilitate coupling to the restriction indicator 14. The second distance 88 may be aligned with (for example, extending parallel to) the axis 16 and be measured as the distance between the upper edge 36 of the receptacle wall 24 and an upper edge 84 of the aperture 26. A cooperative relationship between the first distance 86 and the second distance 88 may facilitate securing the restriction indicator 14 to the receptacle wall 24 of the housing 12. In particular, the first distance 86 may be greater than or equal to the second distance 88.

The first distance 86 may define a minimum distance between the outer shoulder 66 and the detent shoulder 56. In some embodiments, the first distance 86 may be greater than or equal to about 7 mm, about 8 mm, about 8.7 mm, about 9 mm, about 9.7 mm, about 10 mm, about 10.7 mm, about 11 mm, or about 12 mm. Preferably, the first distance 86 is greater than or equal to about 8 mm. The first distance 86 may be in a range of about 7 mm to about 12 mm, about 8 mm to about 11 mm, about 8.7 mm to about 10.7 mm, or about 9 mm to about 10 mm. Preferably, the first distance 86 is in a range of about 8.7 mm to about 10.7 mm. Preferably, the first distance 86 is equal to about 9.7 mm. In some embodiments, the tolerance of any of these values may be equal to about +/−0.005 inches (0.13 mm).

The restriction indicator 14 may define a third distance 90 (FIG. 7) to facilitate coupling to the receptacle 18 of the housing 12. The third distance 90 may be aligned with (for example, extending parallel to) the axis 16 and be measured as the distance between the outer shoulder 66 of the lower collar portion 68 and a bottom or lowest edge 94 of the tab 52. The receptacle 18 may define a fourth distance 92 (FIG. 8) to facilitate coupling to the restriction indicator 14. The fourth distance 92 may be aligned with (for example, extending parallel to) the axis 16 and be measured as the distance between the portion 62 of the exterior surface 22 of the housing 12 (floor of the receptacle 18) and the upper edge 36 of the receptacle wall 24. A cooperative relationship between the third distance 90 and the fourth distance 92 may facilitate fitting and securing the restriction indicator 14 to the receptacle 18 of the housing 12. In particular, the third distance 90 may be less than or equal to the fourth distance 92.

The third distance 90 may define a maximum distance between the outer shoulder 66 and the lowest edge 94 of the tab 52. In some embodiments, the third distance 90 may be less than or equal to about 20 mm, about 19 mm, about 18.9 mm, about 18 mm, about 17.9 mm, about 17 mm, about 16.9 mm, about 16 mm, or about 15 mm. The third distance 90 may be in a range of about 20 mm to about 15 mm, about 19 mm to about 16 mm, about 18.9 mm to about 16.9 mm, or about 18 mm to about 17 mm. Preferably, the third distance 90 is in a range of about 18.9 mm to about 16.9 mm. Preferably, the third distance 90 is equal to about 17.9 mm.

A tortuous fluid communication path 96 (FIG. 7) may be defined by the restriction indicator 14. In general, the tortuous fluid communication path 96 may be disposed between the reset knob 32 and the cap 30. In particular, the tortuous fluid communication path 96 may extend from a first end 98 in fluid communication with the ambient environment to a second end 100 in fluid communication with a first interior environment 102 of the restriction indicator 14. The first end 98 may be disposed between an outer portion of the reset knob 32 and the cap 30. The second end 100 may be disposed between an inner portion of the reset knob 32 and the cap 30.

The tortuous fluid communication path 96 may provide a vent for the first interior environment 102 as vacuum pressure in the interior volume 20 is being measured. The tortuous fluid communication path 96 may include a plurality of bends between the first end 98 and the second end 100, which may prevent contaminants, such as water, dirt, and oil, from entering the first interior environment 102.

The first interior environment 102 may be defined between the diaphragm 106 and the cap 30. The first interior environment 102 may be separated or sealed from a second interior environment 104 by the diaphragm 106. The diaphragm 106 may be formed of any suitable flexible material capable of sealing, such as a silicone material. The second interior environment 104 may be in fluid communication with the interior volume 20 of the housing 12 via the bore 42 when the restriction indicator 14 is coupled to the receptacle 18 of the housing 12. As vacuum pressure in the interior volume 20 changes, the diaphragm 106 may respond by raising or lowering, which may change the proportional volume between the first interior environment 102 and the second interior environment 104.

Figure 9:
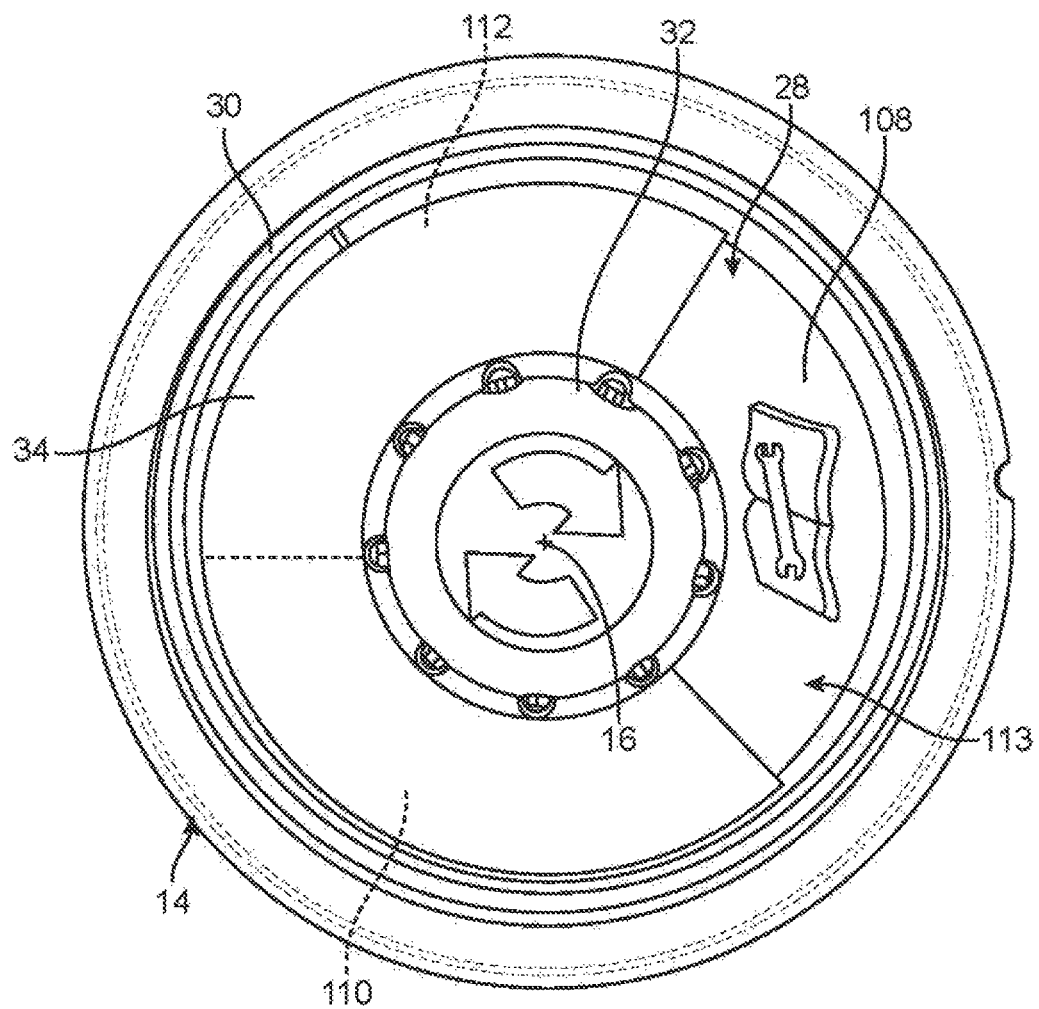
FIG. 9 is an overhead view of the restriction indicator of FIG. 3 in line with the axis.

FIG. 9 shows the restriction indicator 14 in an overhead view in line with the axis 16. The cap 30 may extend around the reset knob 32 to cover the indication element 28. The cap 30 may be entirely clear, transparent, or at least translucent enough to see the indication of restriction. The cap 30 may magnify the indication of restriction. The mask 34 may be disposed between the indication element 28 and the cap 30. A window 113 may be defined by the mask 34 through which the indication element 28 may be viewed.

The indication element 28 may include a plurality of indication regions 108, 110, 112 each associated with different indications of restriction. The indication regions 108, 110, 112 may be about the same size or different sizes. The sizes may be characterized in terms of arc segment. In some embodiments, the indication element 28 includes three indication regions having an arc segment of about 120 degrees each.

As shown, only one of the indication regions 108 may be visible through the window 113 of the mask 34. The other indication regions 110, 112 may be visible through the window 113 of the mask 34 as the indication element 28 rotates in response to various vacuum pressures detected by the restriction indicator 14. The restriction indicator 14 may be capable of rotating the indication element 28 greater than or equal to about 120 degrees, about 180 degrees, about 270 degrees, or about 360 degrees. Greater rotation capability may facilitate larger sizes of the indication regions 108, 110, 112.

Each indication region 108, 110, 112 may be fully displayed through the window 113 of the mask 34 (one at a time). Preferably, each indication region 108, 110, 112 has a size greater than or equal to the size of the window 113.

Figure 10:
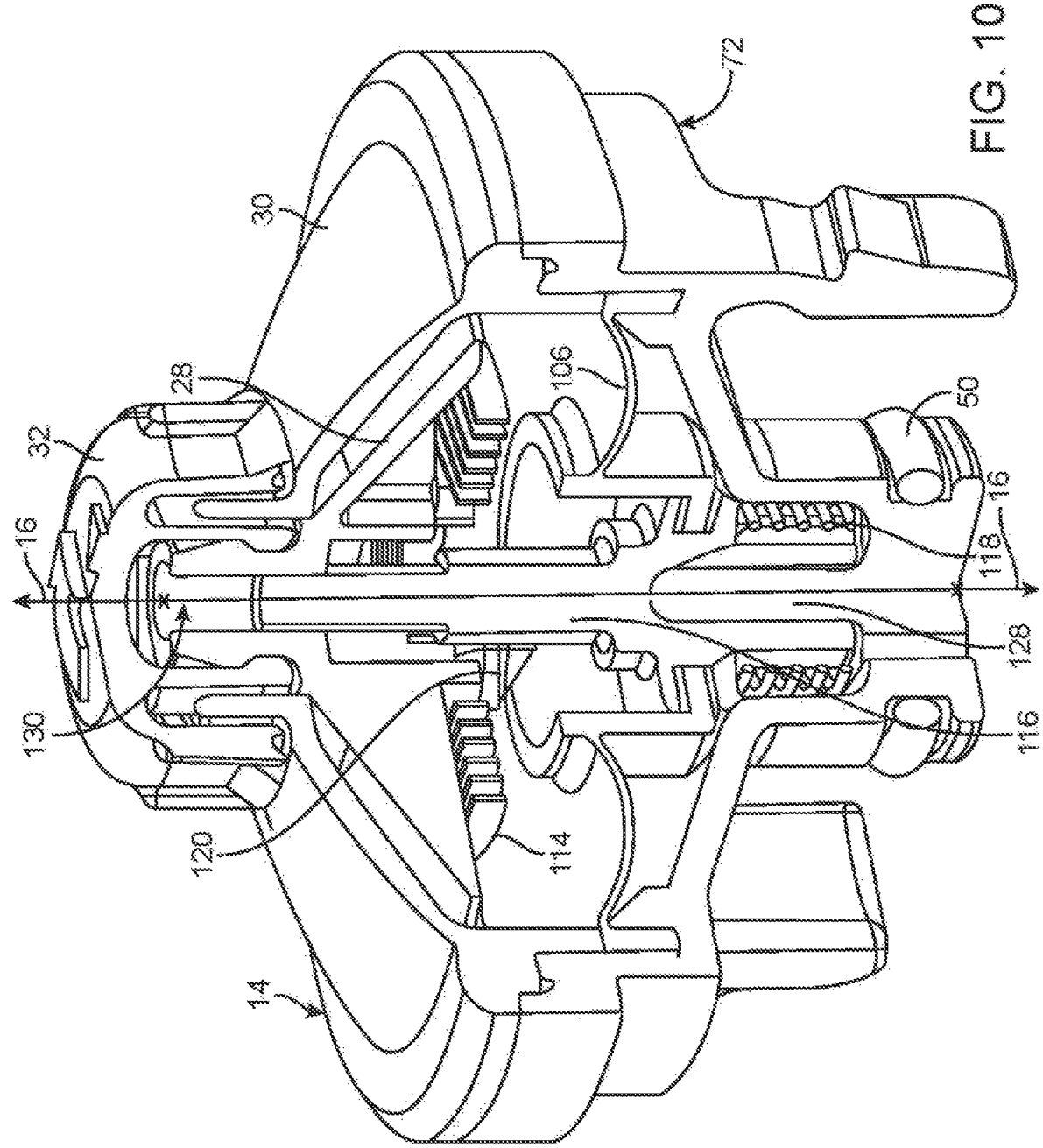
FIG. 10 is cutaway perspective view of the restriction indicator of FIG. 3.
Figures 11, 12:
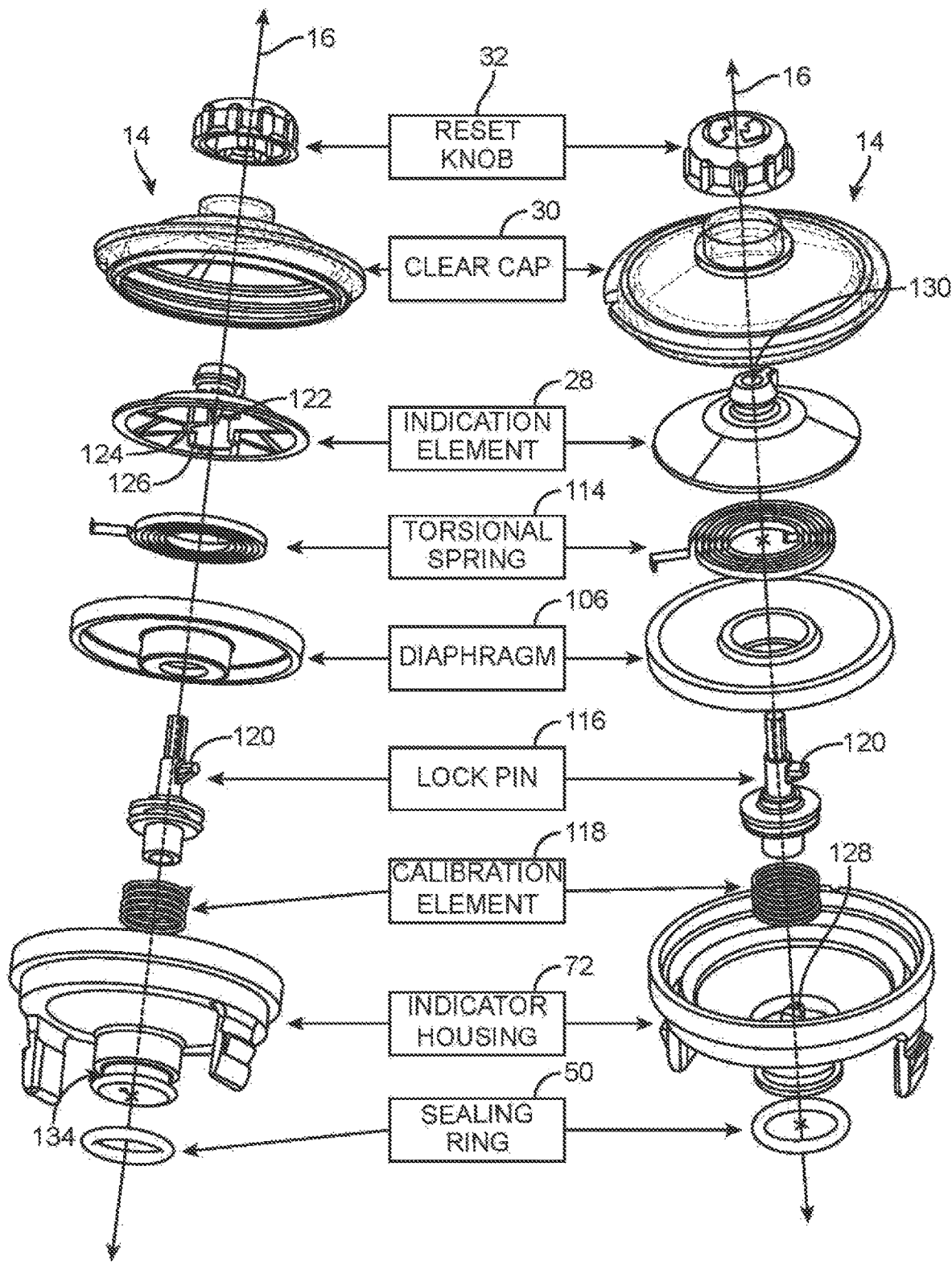
FIG. 11 and FIG. 12 are exploded perspective views of the restriction indicator of FIG. 3 showing various components of the restriction indicator from two different perspectives.

FIG. 10 shows the restriction indicator 14 in a cutaway perspective view. FIG. 11 and FIG. 12 show various components of the restriction indicator 14 in exploded perspective views selected to show the upper and lower surfaces of the components. In particular, the various components are shown separated along the axis 16. In general, many of the components of the restriction indicator 14 have rotationally symmetric dimensions about the axis 16, which may facilitate movement of a generally circular-shaped indication element 28.

The restriction indicator 14 may include one or more of the reset knob 32, cap 30, indication element 28, torsional spring 114, diaphragm 106, lock pin 116, calibration element 118, indicator housing 72, and sealing ring 50. The indicator housing 72 may include a channel 134 to retain the sealing ring 50.

The restriction indicator 14 may utilize a follower cam design to translate the linear motion of the diaphragm 106 into rotational motion of the indication element 28 to provide an indication of a restriction or remaining filter life. As the calibration element 118, diaphragm 106, and lock pin 116 move in linear correlation to the vacuum level, an indexing or advancing geometry may be used to provide an indication of increased vacuum pressure. In particular, the indication element 28 includes different levels of cam steps 122, 124, 126 that interact with the lock pin 116. Although the follower cam sign may utilize one or more calibration elements 118, the follower cam design may utilize only one calibration element 118 to achieve vacuum pressure detection.

An outer portion of the diaphragm 106 may form a seal between the cap 30 and the indicator housing 72 to prevent fluid communication between environments in the restriction indicator 14. Changes in vacuum pressure may move the diaphragm 106 generally upward or downward along the axis 16. In some embodiments, the cap 30 may be ultrasonically welded to the indicator housing 72. In other embodiments, the cap 30 may be integrally formed with the indicator housing 72.

An inner portion of the diaphragm 106 may seal to the lock pin 116. As the diaphragm 106 moves, the lock pin 116 will move in the same direction. A lower portion of the lock pin 116 may be guided along the axis 16 by rotational lock element 128. The rotational lock element 128 may be a protrusion extending upward from the indicator housing 72. The protrusion may have a triangular cross-sectional shape. An upper portion of the lock pin 116 may be guided along the axis 16 by a passage 130 formed in the indication element 28. Guided by the rotational lock element 128 and the passage 130, the lock pin 116 may be described as a floating lock pin relative to other components of the restriction indicator 14.

The torsional spring 114 may be coupled between the indication element 28 and the cap 30. The torsional spring 114 may be described as a "clock" spring that spirals from an inner portion to an outer portion. In particular, the inner portion may be coupled to the indication element 28, and the outer portion may be coupled to the cap 30 or indicator housing 72. The torsional spring 114 may apply a load to the indication element 28 that encourages the indication element to rotate in a single direction (for example, clockwise or counter-clockwise) from an indication that the filter is not restricted (for example, a green indication region) toward an indication that the filter is moderately restricted (for example, a yellow indication region) and toward an indication that the filter is substantially restricted (for example, a red indication region).

The rotation of the indication element 28 about the axis 16 may be impeded by an interaction with the lock pin 116. The lock pin 116 may include a follower protrusion 120. The follower protrusion 120 may engage a cam disposed on a lower portion of the indication element 28 having various cam steps 122, 124, 126. Each cam step 122, 124, 126 may have a different height and be associated with a different indication region of the indication element. The height transition between each step 122, 124, 126 may define discrete positions for the follower protrusion 120 to lock the indication element 28 relative to the lock pin 116.

The follower protrusion 120 in cooperation with the cam steps 122, 124, 126 may allow the restriction indicator 14 to maintain and display the restriction of the air filter, even when the engine is turned off and there is no vacuum pressure detected. This may facilitate checking the condition of the air filter, even when the engine is off.

For example, the first cam step 122 may be associated with the lock pin 116 being in a highest position in the restriction indicator 14 and associated with displaying a green indication region of the indication element 28 to users. The follower protrusion 120 may rest at the height transition between the first cam step 122 and the second cam step 124 to display the green indication region.

As vacuum pressure increases due to restriction of the filter, the lock pin 116 may move linearly downward, which may cause the follower protrusion 120 to separate vertically from the first cam step 122 and toward the level of the second cam step 122. The indication element 28 may not move linearly in response to increased vacuum pressure to facilitate the separation. Once the follower protrusion 120 reaches the level of the second cam step 124, the height transition between the first and second cam steps 122, 124 no longer impedes the rotation of the indication element 28. The torsional spring 114 may rotate the indication element 28 so that the follower protrusion 120 travels across the second cam step 124 and rests at the height transition between the second and third cam steps 124, 126. In this position, the restriction indicator 14 may display a yellow indication region of the indication element 28 to users.

Then, as vacuum pressure further increases due to restriction of the filter, the lock pin 116 may move linearly downward even further, which may cause the follower protrusion 120 to separate vertically from the second cam step 124 toward the level of the third cam step 126. Once the follower protrusion 120 reaches the level of the third cam step 126, the height transition between the second and third cam steps 124, 126 no longer impedes the rotation of the indication element 28. The torsional spring 114 may rotate the indication element 28 so that the follower protrusion 120 travels across the third cam step 126 and rests at a stop on the opposite side of the third cam step. In this position, the restriction indicator 14 may display a red indication region of the indication element 28 to users. Although only three cam steps 122, 124, 126 are described herein, additional cam steps may be provided to correspond to more graduations of filter loading. The indication element 28 may be configured accordingly based on the additional cam steps to visually indicate the graduations. For example, restriction indicator may provide three or more levels of restriction indication regions and associated cam steps, such as 3, 4, 5, or 10 levels.

An upper portion of the indication element 28 may be coupled to the reset knob 32. In particular, the reset knob 32 may be coupled to the indication element 28 using a snap-fit connection. The upper portion of the indication element 28 may include a rotational lock element 132 so that rotating the reset knob 32 also rotates the indication element 28 and vice versa. The rotational lock element 132 may include a lateral protrusion.

The calibration element 118 may be disposed between the lock pin 116 and the indicator housing 72. The calibration element 118 may be a spring. The calibration element 118 may provide a force that encourages the lock pin 116 away from the indicator housing 72, for example, in an upward direction along the axis 16. The calibration element 118 may have a predetermined spring force based on a particular application. For example, the predetermined spring force may be selected based on the expected nominal pressure in the interior volume of the air cleaner assembly and an expected pressure change corresponding to restriction of the air filter. In other words, the linear movement of the lock pin 116 in response to vacuum pressure may be based on the spring force of the calibration element 118.

Once a filter has been replaced, the reset knob 32 may be rotated manually by the user to cause the indication element 28 to rotate in a direction that reloads the torsional spring 114. The follower protrusion 120 may travel across the cam steps 122, 124, 126 in reverse order (from cam step 126 to cam step 124 to cam step 122). The restriction indicator 14 may be fully reset when the follower protrusion 120 is positioned at the height transition between the first and second cam steps 122, 124 so that the green indication region is displayed.

Figure 13:
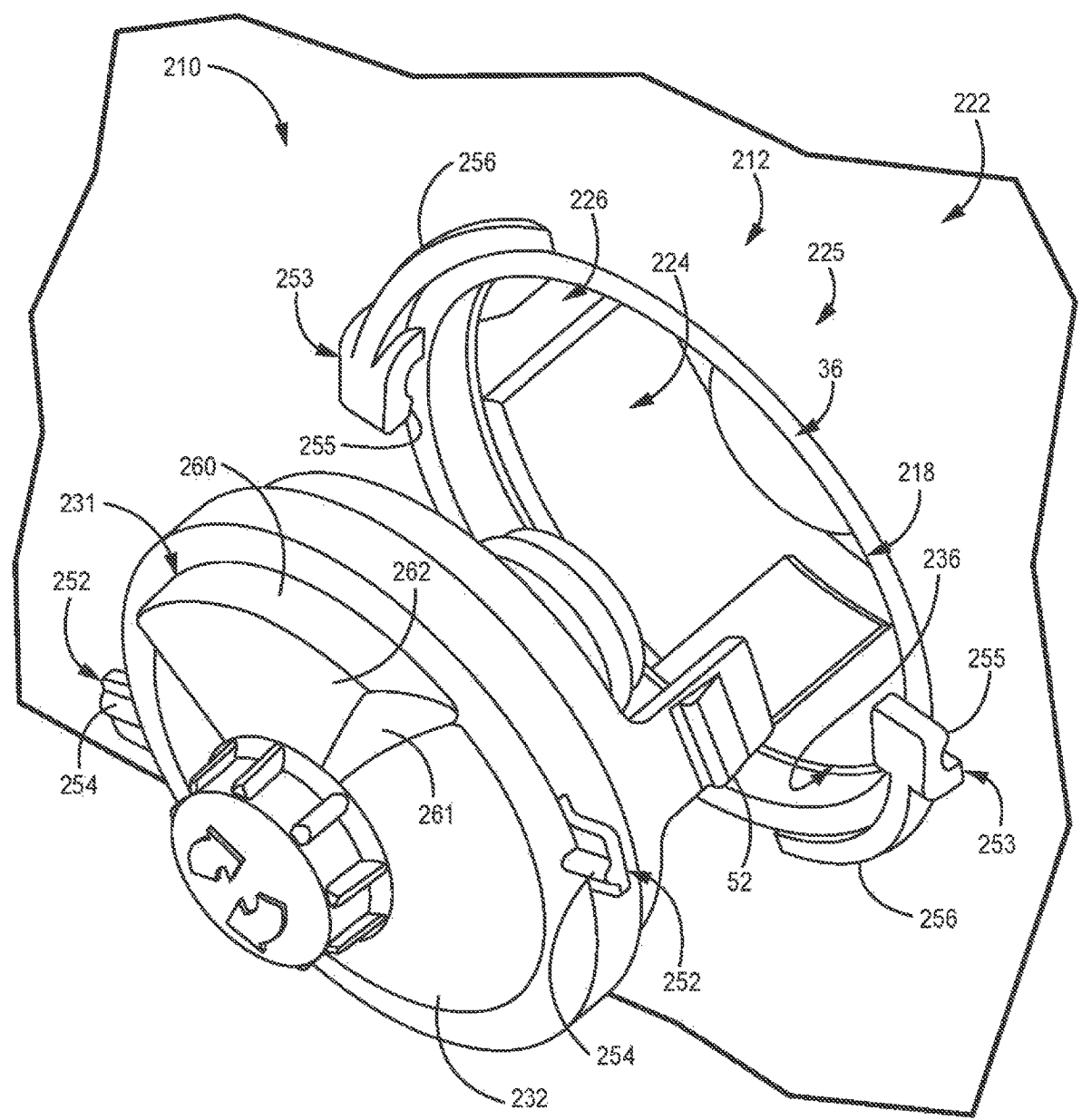
FIGS. 13-16 are various views of an air cleaner assembly including a housing and a restriction indicator for mounting to the housing according to some embodiments of this disclosure.
Figure 14:
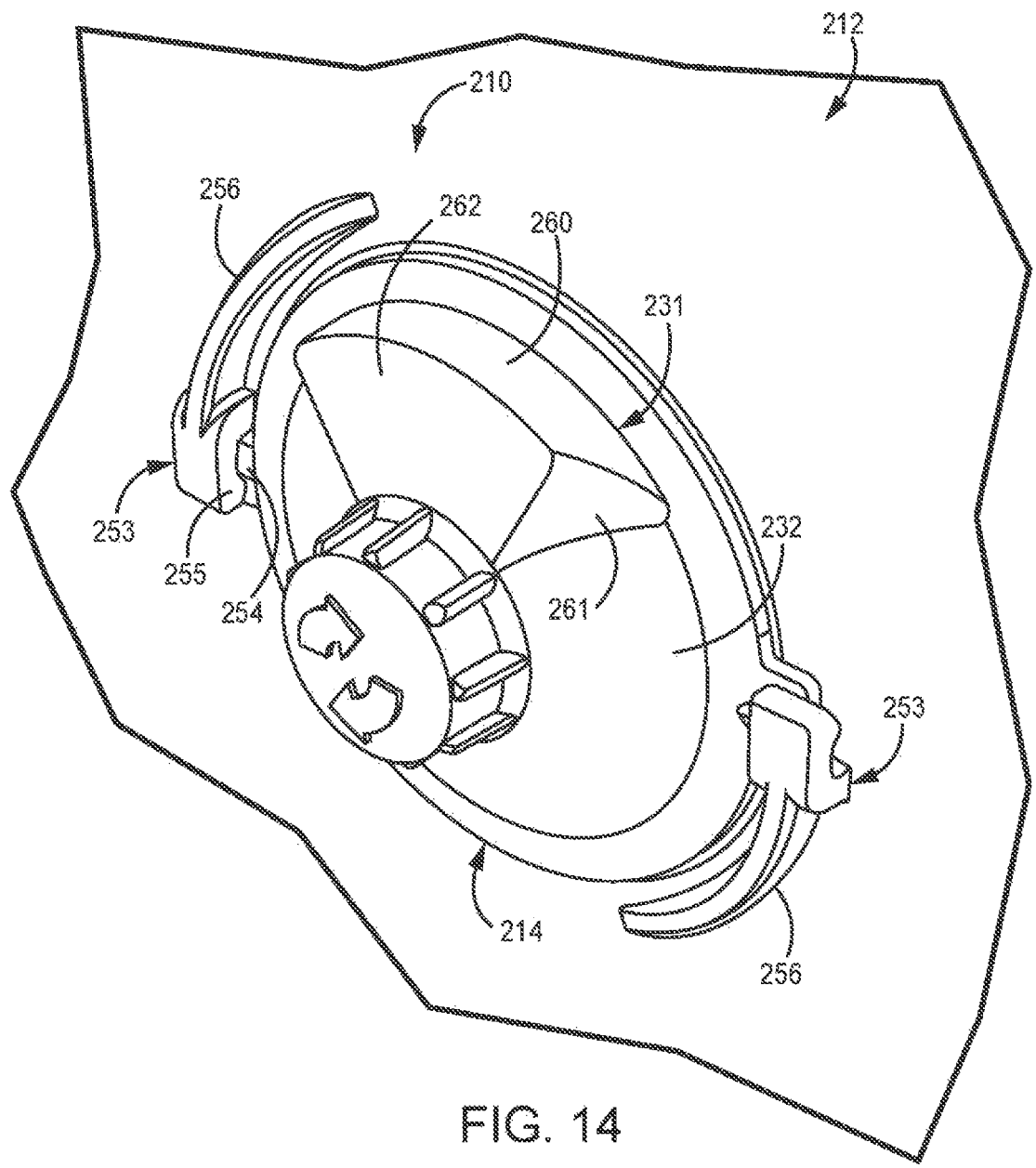
Figure 15:
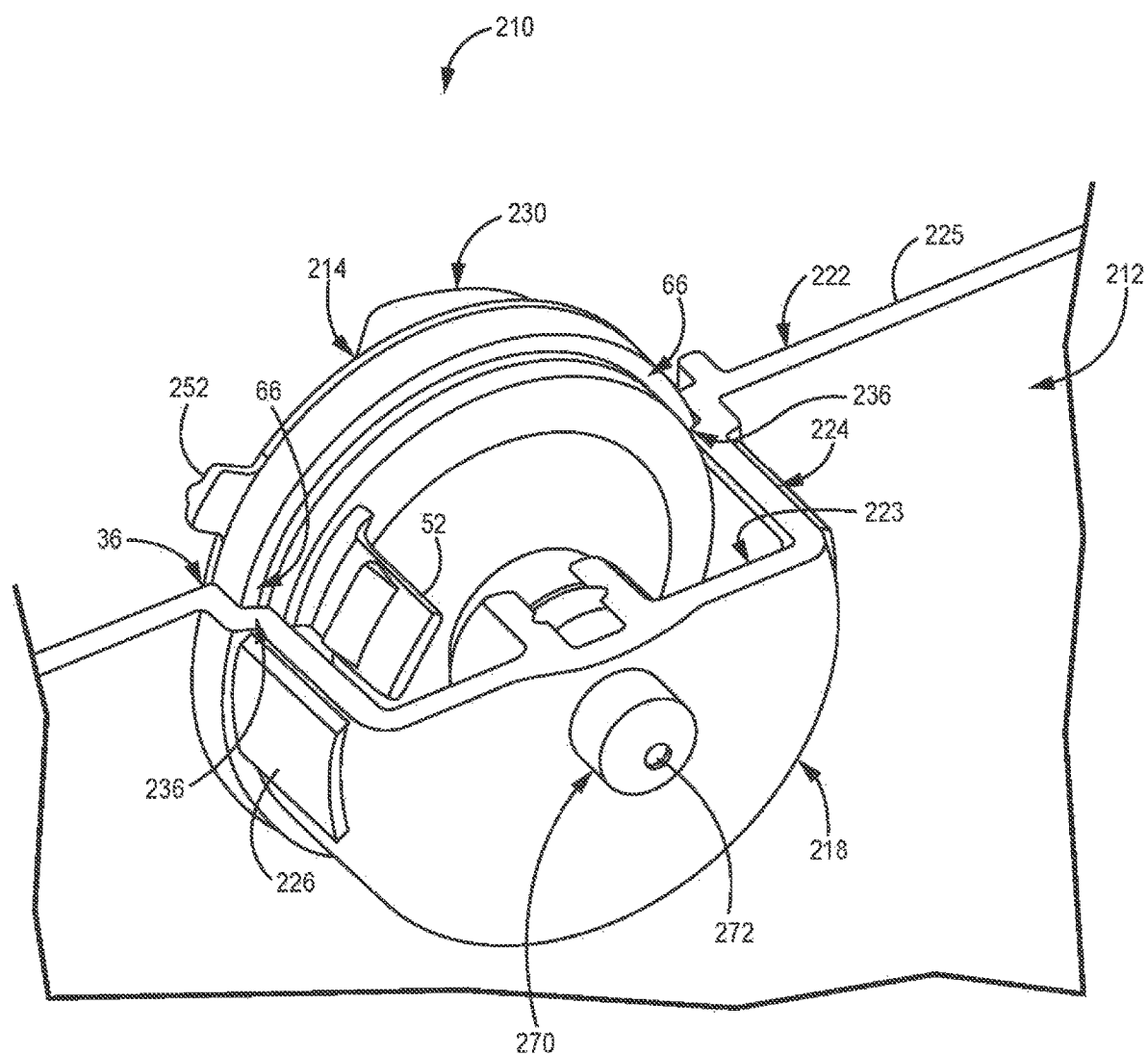
Figure 16:
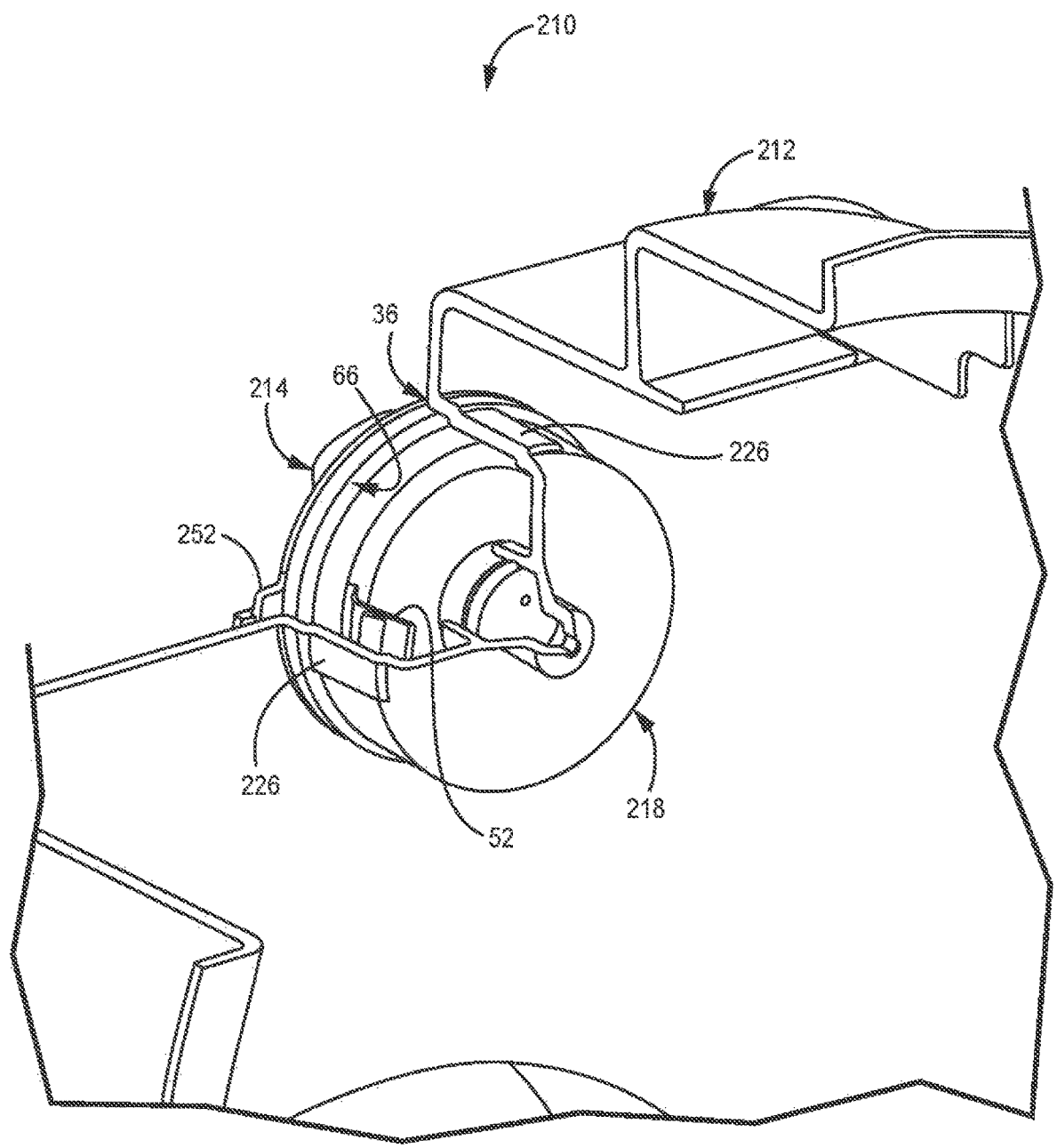

FIGS. 13-16 show an air cleaner assembly 210 including a housing 212 and a restriction indicator 214 for mounting to the housing. FIG. 13 shows the restriction indicator 214 positioned near the housing 212 at the beginning of installation. FIG. 14 shows the restriction indicator 214 installed in the housing 212. FIG. 15 shows a view from the inside of a cutaway of housing 212 when the restriction indicator 214 is inserted before the restriction indicator 214 is rotated into a finally installed position. FIG. 16 shows a view from the inside of another cutaway of housing 212 when the restriction indicator 214 is installed in the housing 212. Air cleaner assembly 210 may have an even lower profile than air cleaner assembly 10 when installed, which may be beneficial in some applications.

The air cleaner assembly 210 is like the air cleaner assembly 10 and may include one or more of the same aspects. Reference is made to the discussion above regarding FIGS. 1-12 for elements depicted in but not specifically discussed with regard to FIGS. 13-16. The air cleaner assembly 210 may functionally differ from the air cleaner assembly 10 in that, instead of a single insertion motion along a longitudinal axis to install the restriction indicator into the housing, the restriction indicator 214 may be installed with an insertion motion along a longitudinal axis followed by a rotational motion, or twist. When installed, the restriction indicator 214 may operate like the restriction indicator 14. Although illustrated as separate embodiments, various aspects of the air cleaner assembly 10 may be used with the air cleaner assembly 210, and vice versa.

In the illustrated embodiment, the air cleaner assembly 210 differs from the air cleaner assembly 10 in that the restriction indicator 214 includes a raised portion 231 and one or more lateral tabs 252 and in that the housing 212 includes one or more latch portions 253, one or more ramp portions 256, and one or more pockets 226 (for example, instead of apertures 26). The one or more lateral tabs 252, the one or more latch portions 253, and the one or more pockets 226 may facilitate removably, or releasably, coupling the restriction indicator 214 to the housing 212. Further, in this illustrated embodiment, a portion 223 (FIG. 15) of the exterior surface 222 of the housing 212 is recessed from a surrounding portion 225 of the exterior surface 222, and the receptacle wall 224 extends between the portion 223 and the surrounding portion 225. The recessed portion 223 and receptacle wall 224 may form a well type of receptacle 218 that can receive the restriction indicator 214 for installation.

In some embodiments, the recessed portion 223 may include a downwardly extending protrusion 270. The protrusion 270 may include an aperture 272 in fluid communication with the interior of the housing 212 and the interior of the receptacle 218.

The cap 230 of restriction indicator 214 may have a raised portion 231. The raised portion 231 may extend at least partially around the restriction indicator 214. The raised portion 231 may extend in an arc segment that is smaller than, larger than, or that coincides with the arc segment of the indication of restriction, or window in the mask.

The raised portion 231 may facilitate viewing the indication of restriction inside the restriction indicator 214 from a shallow angle. The cap 230 may include the raised portion 231 and a low-profile portion 232. The low-profile portion 232 may be positioned adjacent to the raised portion 231. In general, the raised portion 231 may have a steeper slope than the low-profile portion 232. The raised portion 231 may include a laterally facing section 260 (e.g., lateral section), one or more side facing sections 261 (e.g., side sections), and a top facing section 262 (e.g., top section). The laterally facing section 260 may have a steeper slope than the low-profile portion 232. The one or more side facing sections 261 may also have a steeper slope than the low-profile portion 232. In some embodiments, the laterally facing section 260 and the top facing section 262 may form an angle greater than or equal to about 45, 60, or 90 degrees (e.g., measured using vectors orthogonal to the respective surfaces or average orthogonal vectors for non-planar surfaces).

In one step of installation, restriction indicator 214 may be inserted into the receptacle 218 of the housing 212 such that the one or more lateral tabs 252 contact the exterior surface 222 of the surrounding portion 225 of the housing 212. In some embodiments, the one or more lateral tabs 252 may extend outwardly from the cap 230. In the illustrated embodiment, the upper edge 36 of the receptacle 218 is flush with the exterior surface 222 of the surrounding portion 225. The receptacle wall 224 may include a shoulder 236 that engages the outer shoulder 66 of the restriction indicator 214 when inserted into the receptacle 218.

In another step of installation, for example, after the one or more lateral tabs 252 contact the exterior surface 222 of the housing 212 (see FIG. 15), the restriction indicator 214 may be rotated such that the one or more lateral tabs 252 engage with, or are received into, the one or more latch portions 253 to releasably secure the restriction indicator 214 to the housing 212 (see FIGS. 14 and 16). The one or more lateral tabs 252 may extend laterally outward from the restriction indicator as opposed to, for example, extending downward like tabs 52. Each lateral tab 252 may include an axially extending protrusion 254 (e.g., outwardly axial protrusion). When a lateral tab 252 is inserted into a latch portion 253, the latch portion 253 may include a shoulder 255 that releasably engages the axially extending protrusion 254. In particular, the latch portion 253 may deflect as the axially extending protrusion 254 engages the shoulder 255 of the latch portion 253 and the latch portion 253 may relax after the axially extending protrusion 254 passes the shoulder 255. The shoulder 255 may engage the axially extending protrusion 254 to prevent rotational movement in a rotational direction. When a lateral tab 252 is received into a latch portion 253, movement of the restriction indicator 214 may be prevented in the axial directions and in one or two rotational directions.

When the restriction indicator 214 is inserted into the receptacle 218, the one or more tabs 52 may engage the receptacle wall 224 and be deflected laterally inwardly. The one or more pockets 226 may be positioned on the receptacle wall 224 such that when the one or more lateral tabs 252 are rotated into the one or more latch portions 253, each tab 52 may be rotated into a respective pocket 226. When the tab 52 is releasably engaged with, or received into, the respective pocket 226, the tab 52 may relax and prevent movement of the restriction indicator 214 in one or two rotational directions. The restriction indicator 214 may be fully installed when the one or more lateral tabs 252 are received in, or engaged with, the one or more latch portions 253 and the one or more tabs 52 are received in, or engaged with, the one or more pockets 226. The restriction indicator 214 may not be easily removed from the receptacle 218 without a threshold amount of rotational force.

In the illustrated embodiment, each pocket 226 is aligned with a respective latch portion 253, and each lateral tab 252 is aligned with a respective tab 52. In other embodiments, one or more pockets 226 may not be aligned with a respective latch portion 253 and/or one or more lateral tabs 252 may not be aligned with a respective tab 52.

Also, in the illustrated embodiment, the restriction indicator 214 may include two tabs 52 and two lateral tabs 252, and the housing 212 may include two latch portions 253 and two pockets 226. Any suitable number of one or more tabs 52, lateral tabs 252, latch portions 253, and pockets 226 may be used to secure the restriction indicator 214 to the housing 212.

Further, as illustrated, each pocket 226 is integrally formed as a single piece with the receptacle wall 224. The exterior side of each pocket 226 protrudes from the exterior of the receptacle wall 224. In other embodiments, one or more pockets 226 may be separately formed from the receptacle wall 224 and/or the exterior side of one or more pockets 226 may not protrude from the exterior of the receptacle wall 224. In general, each pocket 226 may be located to suitably engage a tab 52, and each latch portion 253 may be located to suitably engage a lateral tab 252, and vice versa.

In some embodiments, each pocket 226 may have two edges that each extend axially to define a radial width of the pocket. When installed, each tab 52 may be seated between both edges of the pocket 226. One or both edges may be gradual (e.g., less than about 90 degrees, such as about 45 degrees) or sharp (e.g., about 90 degrees). In some embodiments, one edge may be gradually sloped, and the other edge may be sharply sloped. A gradual edge may allow the tab 52 to slide out of the pocket 226 for removal. A sharp edge may prevent the tab 52 from over-rotating past the pocket 226 for installation.

The housing 212 may include one or more ramp portions 256 on the exterior surface 222 of the surrounding portion 225. Each ramp portion 256 may be positioned to engage the one or more lateral tabs 252 when the restriction indicator 214 is inserted in the receptacle 218. Each ramp portion 256 may be positioned proximate, near, or adjacent to a respective latch portion 253. Each ramp portion 256 may reinforce the respective latch portion 253 and may also facilitate appropriate tactile feedback. For example, when the restriction indicator 214 is rotated in the wrong direction for installation, the rotation of the restriction indicator 214 will not be stopped because the one or more lateral tabs 252 will ride over one or more ramp portions 256 and over the respective latch portions 253. Whereas when rotating the restriction indicator 214 in the correct direction for installation, the one or more lateral tabs 252 will engage the one or more latch portions 253 and rotation will be stopped. In some embodiments, one or more ramp portions 256 may be integrally formed as a single piece, or separately formed, with the one or more latch portions 253. The one or more ramp portions 256 may be integrally formed as a single piece, or separately formed, with the housing 212.

Figure 17:
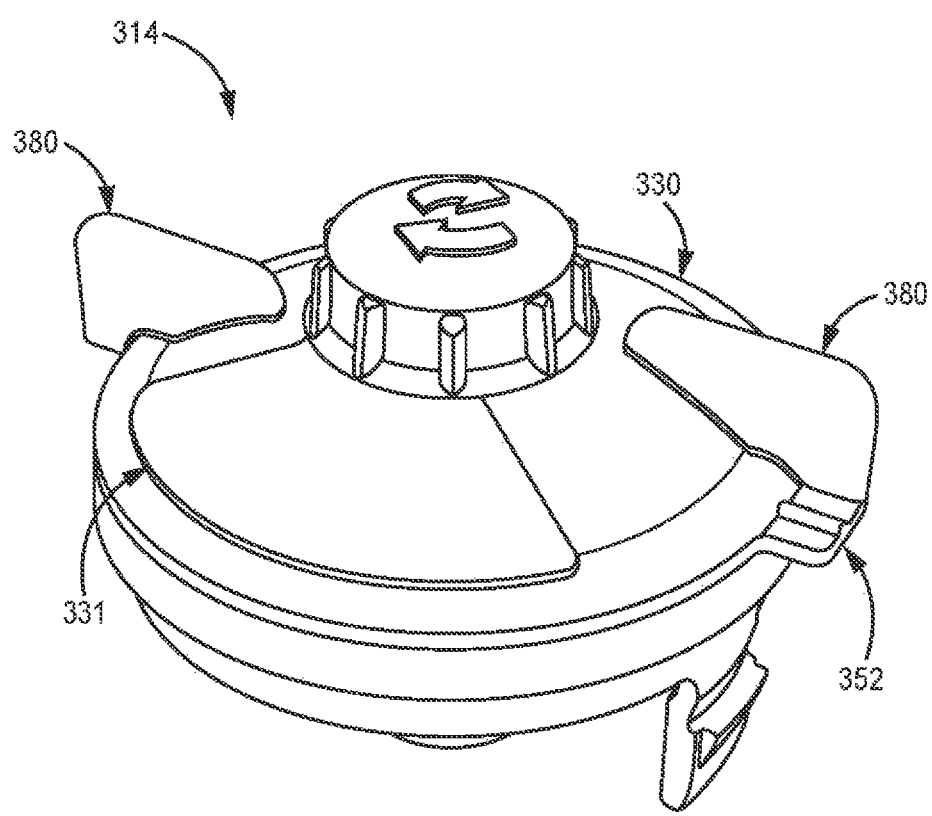
FIGS. 17-18 are various views of a restriction indicator according to other embodiments of this disclosure.
Figure 18:
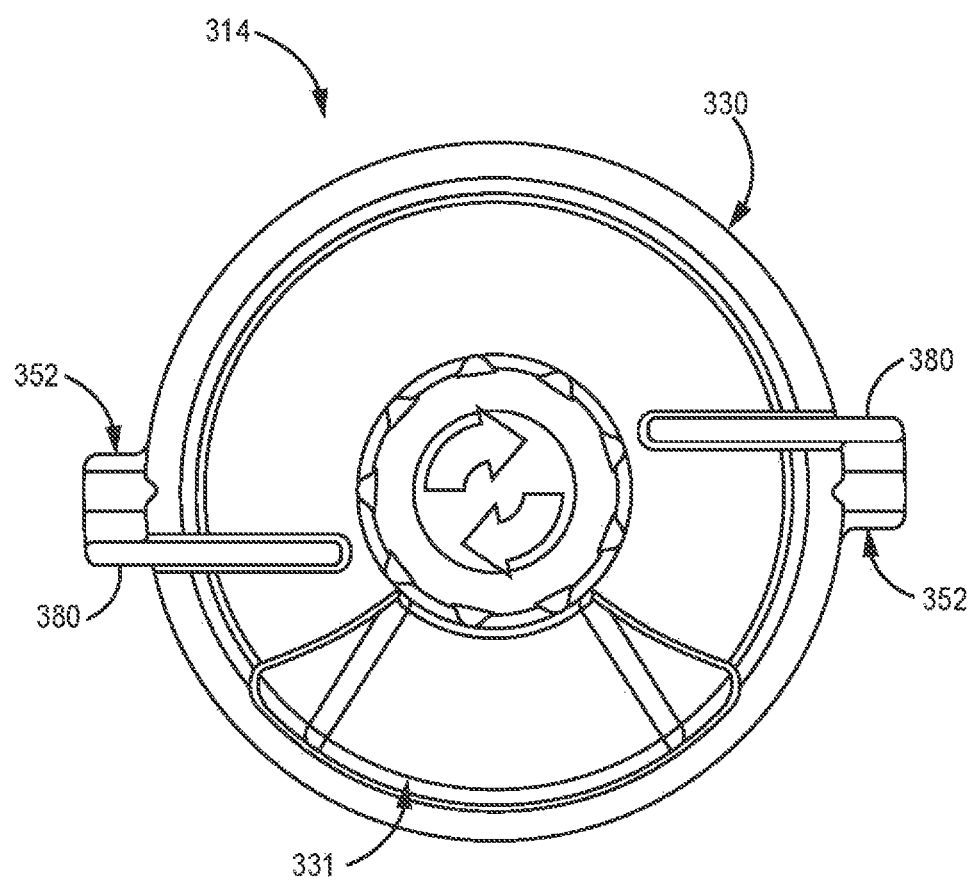

FIGS. 17-18 show a restriction indicator 314 for mounting to a housing, such as housing 12 or 212. The restriction indicator 314 is like the restriction indicators 14 and 214 and may include one or more of the same aspects. Reference is made to the discussion above regarding FIGS. 1-16 for elements depicted in but not specifically discussed with regard to FIGS. 17-18. For example, as illustrated, the restriction indicator 314 is like restriction indicator 214 in that restriction indicator 314 includes a cap 330 having a raised portion 331 and one or more lateral tabs 352 configured to engage a housing, such as housing 212. However, restriction indicator 314 differs from restriction indicator 214 in that restriction indicator 314 includes one or more user engageable tabs 380.

The one or more user engageable tabs 380 may be manually grasped by a user to twist, or rotate, the restriction indicator 314 during installation or removal. The one or more user engageable tabs 380 may be located in any suitable location on the cap 330. For example, each user engageable tab 380 may be integrally formed with a respective lateral tab 352 into a single piece or separately formed from the lateral tabs 352.

In general, the one or more user engageable tabs 380 may extend axially in an upward direction and may also extend laterally from an outer perimeter, or edge, of the cap 330 inward toward a center of the cap 330. For example, each user engageable tab 380 may extend away from the housing when the restriction indicator 314 is installed in the housing. However, any suitable orientation and size of user engageable tab 380 may be used to facilitate torqueing the restriction indicator 314 during installation or removal, for example, by hand to facilitate the ease of installation and service.

ILLUSTRATIVE EMBODIMENTS

While the present disclosure is not so limited, an appreciation of various aspects of the disclosure will be gained through a discussion of the specific illustrative embodiments provided below. Various modifications of the examples and illustrative embodiments, as well as additional embodiments of the disclosure, will become apparent herein.

Embodiment 1 is an air cleaner assembly comprising a housing that comprises an exterior surface around an interior volume. The housing comprises a bore extending through a portion of the exterior surface of the housing along an insertion axis and surrounded by a bore wall protruding from the portion of the exterior surface along the insertion axis. The housing also comprises a receptacle wall around the bore wall along the insertion axis and radially spaced from the bore wall to form a channel between the bore wall and the receptacle wall. The air cleaner assembly also comprises a restriction indicator configured to measure a restriction in the interior volume when coupled to the housing and to display an indication of the restriction. The restriction indicator comprises an indication element configured to display the indication of the restriction; a stem at least partially insertable into the bore along the insertion axis and configured to engage an inner surface of the bore wall when disposed therein; and one or more tabs at least partially insertable in the channel between the bore wall and the receptacle wall and configured to facilitate removably coupling the restriction indicator to the housing.

Embodiment 2 is the air cleaner assembly of embodiment 1, wherein the receptacle wall protrudes outwardly from the exterior surface.

Embodiment 3 is the air cleaner assembly of embodiment 1 or 2, wherein the portion of the exterior surface is recessed from a surrounding portion of the exterior surface and the receptacle wall extends between the portion and the surrounding portion of the exterior surface.

Embodiment 4 is the air cleaner assembly of any preceding embodiment, wherein inserting the stem at least partially into the bore using a linear motion along the insertion axis forms a seal between the stem and the bore wall and secures the one or more tabs to the receptacle wall to couple the restriction indicator to the housing.

Embodiment 5 is the air cleaner assembly of any preceding embodiment, wherein the restriction indicator further comprises a sealing ring disposed around the stem to form a seal between an outer surface of the stem and an inner surface of the bore wall when inserted into the bore.

Embodiment 6 is the air cleaner assembly of any preceding embodiment, wherein, when the restriction indicator is coupled to the housing, a portion of the restriction indicator extends beyond an upper edge of the receptacle wall, the restriction indicator extending a maximum distance along the insertion axis, as measured from the upper edge, less than or equal to about 25 mm.

Embodiment 7 is the air cleaner assembly of embodiment 6, wherein the maximum distance is less than or equal to about 22 mm.

Embodiment 8 is the air cleaner assembly of any preceding embodiment, wherein the restriction indicator comprises a lower shell portion extending between the stem and a lower collar portion of the restriction indicator, the stem and the one or more tabs each extend downwardly from the lower shell portion of the restriction indicator, the lower shell portion comprising a maximum width extending orthogonal to the insertion axis less than or equal to about 43 mm.

Embodiment 9 is the air cleaner assembly of any preceding embodiment, wherein the stem comprises a maximum width extending orthogonal to the insertion axis less than or equal to about 16 mm.

Embodiment 10 is the air cleaner assembly of any preceding embodiment, wherein each tab is deflectable to couple or uncouple to the receptacle wall.

Embodiment 11 is the air cleaner assembly of any preceding embodiment, wherein the receptacle wall comprises one or more apertures extending therethrough and the one or more tabs of the restriction indicator each comprise a detent configured to be received in a corresponding aperture to secure the restriction indicator to the housing.

Embodiment 12 is the air cleaner assembly of embodiment 11, wherein the restriction indicator comprises at most two detents received in apertures when coupled to the housing.

Embodiment 13 is the air cleaner assembly of embodiment 11 or 12, wherein each aperture is disposed opposite to another aperture across the insertion axis.

Embodiment 14 is the air cleaner assembly of any of embodiments 11 to 13, wherein the restriction indicator comprises: an outer shoulder of a lower collar portion configured to engage an upper edge of the receptacle wall when the restriction indicator is coupled to the housing; and a detent shoulder on each detent configured to engage an upper edge of the aperture in the receptacle wall, wherein a first distance aligned with the insertion axis measured from the outer shoulder and the detent shoulder is greater than or equal to a second distance aligned with the insertion axis measured from the upper edge of the receptacle wall and the upper edge of the aperture.

Embodiment 15 is the air cleaner assembly of embodiment 14, wherein the first distance is greater than or equal to about 8 mm.

Embodiment 16 is the air cleaner assembly of embodiment 14 or 15, wherein a third distance aligned with the insertion axis measured from the outer shoulder to a lowest edge of the one or more tabs is less than or equal to a fourth distance aligned with the insertion axis measured from the portion of the exterior surface of the housing to the upper edge of the receptacle wall.

Embodiment 17 is the air cleaner assembly of embodiment 16, wherein the third distance is less than or equal to about 20 mm.

Embodiment 18 is the air cleaner assembly of any preceding embodiment, wherein the housing further comprises one or more guide rails extending from the receptacle wall into the channel proximate to the one or more apertures.

Embodiment 19 is the air cleaner assembly of embodiment 18, wherein two guide rails are proximate to each aperture and a corresponding tab fits between the two guide rails when the restriction indicator is coupled to the housing.

Embodiment 20 is the air cleaner assembly of any preceding embodiment, wherein each tab comprises a width extending orthogonal to the insertion axis less than or equal to about 10 mm.

Embodiment 21 is the air cleaner assembly of any preceding embodiment, wherein the stem comprises an outer surface, the outer surface comprising a circular cross-sectional shape centered at the insertion axis.

Embodiment 22 is the air cleaner assembly of any preceding embodiment, wherein the bore comprises an inner surface, the inner surface comprising a circular cross-sectional shape centered at the insertion axis.

Embodiment 23 is the air cleaner assembly of any preceding embodiment, wherein the receptacle wall comprises an inner surface, the inner surface comprising a circular cross-sectional shape centered at the insertion axis.

Embodiment 24 is the air cleaner assembly of any preceding embodiment, wherein the restriction indicator comprises an at least partially clear cap covering the indication element.

Embodiment 25 is the air cleaner assembly of embodiment 24, wherein the cap comprises a convex exterior surface to magnify the indication of the restriction.

Embodiment 26 is the air cleaner assembly of embodiment 24 to 25, wherein the restriction indicator further comprises a reset knob and a tortuous fluid communication path between the knob and the cap.

Embodiment 27 is the air cleaner assembly of any of embodiments 24 to 26, wherein the restriction indicator comprises a torsional spring coupled to the indication element and the cap.

Embodiment 28 is the air cleaner assembly of any of embodiments 24 to 27, wherein the cap comprises a raised portion adjacent to a low-profile portion of the cap, wherein the raised portion has a steeper slope than the low-profile portion to facilitate viewing from a shallow angle.

Embodiment 29 is the air cleaner assembly of any of embodiments 24 to 28, wherein the restriction indicator comprises a floating lock pin defining a plurality of indication regions.

Embodiment 30 is the air cleaner assembly of any of embodiments 24 to 29, wherein the indication of the restriction is displayed in an arc segment greater than or equal to about 90 degrees.

Embodiment 31 is the air cleaner assembly of any preceding embodiment, wherein the restriction indicator further comprises one or more lateral tabs each configured to engage a latch portion on the exterior surface of the housing configured to facilitate removably coupling the restriction indicator to the housing.

Embodiment 32 is the air cleaner assembly of embodiment 31, wherein each lateral tab comprises an axial protrusion configured to releasably engage a shoulder of the latch portion.

Embodiment 33 is the air cleaner assembly of embodiment 31 or 32, further comprising one or more ramp portions on the exterior surface of the housing each near a respective latch portion.

Embodiment 34 is the air cleaner assembly of any preceding embodiment, wherein the receptacle wall comprises one or more pockets configured to receive the one or more tabs to facilitate removably coupling the restriction indicator to the housing.

Embodiment 35 is the air cleaner assembly of any preceding embodiment, wherein the restriction indicator further comprises one or more user engageable tabs extending away from the housing when the restriction indicator is installed in the housing.

Thus, various embodiments of the AIR CLEANER ASSEMBLY WITH RESTRICTION INDICATOR are disclosed. Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements).

Terms related to orientation, such as "up," "down," "upper," "lower," "top," "bottom," "end," "longitudinal," "lateral," and other similar terms are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. Other embodiments may also be preferred, under the same or other circumstances. Furthermore, the recitation of one or more preferred embodiments does not imply that other embodiments are not useful, and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to". It will be understood that "consisting essentially of" "consisting of," and the like are subsumed in "comprising," and the like.

The phrases "at least one of" "comprises at least one of" and "one or more of" followed by a list refers to any one of the items in the list and any combination of two or more items in the list.

What is claimed is:

1. An air cleaner assembly comprising:
    a housing comprising an exterior surface around an interior volume, the housing comprising:
        a bore extending through a portion of the exterior surface of the housing along an insertion axis and surrounded by a bore wall protruding from the portion of the exterior surface along the insertion axis; and
        a receptacle wall around the bore wall along the insertion axis and radially spaced from the bore wall to form a channel between the bore wall and the receptacle wall; and
    a restriction indicator configured to measure a restriction in the interior volume when coupled to the housing and to display an indication of the restriction, the restriction indicator comprising:
        an indication element configured to display the indication of the restriction;
        a stem at least partially insertable into the bore along the insertion axis and configured to engage an inner surface of the bore wall when disposed therein; and
        one or more tabs at least partially insertable in the channel between the bore wall and the receptacle wall and configured to facilitate removably coupling the restriction indicator to the housing,
    wherein each tab is deflectable to couple or uncouple to the receptacle wall.

2. The air cleaner assembly of claim 1, wherein the receptacle wall protrudes outwardly from the exterior surface.

3. The air cleaner assembly of claim 1, wherein the portion of the exterior surface is recessed from a surrounding portion of the exterior surface and the receptacle wall extends between the portion and the surrounding portion of the exterior surface.

4. The air cleaner assembly of claim 1, wherein inserting the stem at least partially into the bore using a linear motion along the insertion axis forms a seal between the stem and the bore wall and secures the one or more tabs to the receptacle wall to couple the restriction indicator to the housing.

5. The air cleaner assembly of claim 1, wherein the receptacle wall comprises one or more apertures extending therethrough and the one or more tabs of the restriction indicator each comprise a detent configured to be received in a corresponding aperture to secure the restriction indicator to the housing.

6. The air cleaner assembly of claim 1, wherein the restriction indicator comprises an at least partially clear cap covering the indication element.

7. The air cleaner assembly of claim 6, wherein the cap comprises a convex exterior surface to magnify the indication of the restriction.

8. The air cleaner assembly of claim 6, wherein the restriction indicator further comprises a reset knob and a tortuous fluid communication path between the knob and the cap.

9. The air cleaner assembly of claim 6, wherein the restriction indicator comprises a torsional spring coupled to the indication element and the cap.

10. The air cleaner assembly of claim 6, wherein the cap comprises a raised portion adjacent to a low-profile portion of the cap, wherein the raised portion has a steeper slope than the low-profile portion to facilitate viewing from a shallow angle.

11. The air cleaner assembly of claim 1, wherein the restriction indicator comprises a floating lock pin defining a plurality of indication regions.

12. The air cleaner assembly of claim 1, further comprising one or more ramp portions on the exterior surface of the housing each near a respective latch portion.

13. The air cleaner assembly of claim 1, wherein the receptacle wall comprises one or more pockets configured to receive the one or more tabs to facilitate removably coupling the restriction indicator to the housing.

14. The air cleaner assembly of claim 1, wherein the restriction indicator further comprises one or more user engageable tabs extending away from the housing when the restriction indicator is installed in the housing.

15. An air cleaner assembly comprising:
a housing comprising an exterior surface around an interior volume, the housing comprising:
a bore extending through a portion of the exterior surface of the housing along an insertion axis and surrounded by a bore wall protruding from the portion of the exterior surface along the insertion axis; and
a receptacle wall around the bore wall along the insertion axis and radially spaced from the bore wall to form a channel between the bore wall and the receptacle wall; and
a restriction indicator configured to measure a restriction in the interior volume when coupled to the housing and to display an indication of the restriction, the restriction indicator comprising:
an indication element configured to display the indication of the restriction;
a stem at least partially insertable into the bore along the insertion axis and configured to engage an inner surface of the bore wall when disposed therein; and
one or more tabs at least partially insertable in the channel between the bore wall and the receptacle wall and configured to facilitate removably coupling the restriction indicator to the housing,
wherein the receptacle wall comprises one or more apertures extending therethrough and the one or more tabs of the restriction indicator each comprise a detent configured to be received in a corresponding aperture to secure the restriction indicator to the housing.

16. The air cleaner assembly of claim 15, wherein the restriction indicator comprises:
an outer shoulder of a lower collar portion configured to engage an upper edge of the receptacle wall when the restriction indicator is coupled to the housing; and
a detent shoulder on each detent configured to engage an upper edge of the aperture in the receptacle wall,
wherein a first distance aligned with the insertion axis measured from the outer shoulder and the detent shoulder is greater than or equal to a second distance aligned with the insertion axis measured from the upper edge of the receptacle wall and the upper edge of the aperture.

17. The air cleaner assembly of claim 16, wherein a third distance aligned with the insertion axis measured from the outer shoulder to a lowest edge of the one or more tabs is less than or equal to a fourth distance aligned with the insertion axis measured from the portion of the exterior surface of the housing to the upper edge of the receptacle wall.

18. The air cleaner assembly of claim 15, wherein the housing further comprises one or more guide rails extending from the receptacle wall into the channel proximate to the one or more apertures.

19. The air cleaner assembly of claim 18, wherein two guide rails are proximate to each aperture and a corresponding tab fits between the two guide rails when the restriction indicator is coupled to the housing.

20. An air cleaner assembly comprising:
a housing comprising an exterior surface around an interior volume, the housing comprising:
a bore extending through a portion of the exterior surface of the housing along an insertion axis and surrounded by a bore wall protruding from the portion of the exterior surface along the insertion axis; and
a receptacle wall around the bore wall along the insertion axis and radially spaced from the bore wall to form a channel between the bore wall and the receptacle wall; and
a restriction indicator configured to measure a restriction in the interior volume when coupled to the housing and to display an indication of the restriction, the restriction indicator comprising:
an indication element configured to display the indication of the restriction;
a stem at least partially insertable into the bore along the insertion axis and configured to engage an inner surface of the bore wall when disposed therein; and
one or more tabs at least partially insertable in the channel between the bore wall and the receptacle wall and configured to facilitate removably coupling the restriction indicator to the housing,
wherein the restriction indicator further comprises one or more lateral tabs each configured to engage a latch portion on the exterior surface of the housing configured to facilitate removably coupling the restriction indicator to the housing.

* * * * *